United States Patent
Gregory et al.

(10) Patent No.: US 11,774,244 B2
(45) Date of Patent: *Oct. 3, 2023

(54) 3-AXIS GYROSCOPE WITH ROTATIONAL VIBRATION REJECTION

(71) Applicant: Analog Devices, Inc., Wilmington, MA (US)

(72) Inventors: Jeffrey A. Gregory, Malden, MA (US); Charles Blackmer, Londonderry, NH (US); Tyler Adam Dunn, Westford, MA (US); Eugene Oh Hwang, Long Beach, CA (US); Jinbo Kuang, Acton, MA (US); Kemiao Jia, Tolland, CT (US); Laura Cornelia Popa, Madison, NJ (US); Igor P. Prikhodko, Buzzards Bay, MA (US); Erdinc Tatar, Burlington, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,271

(22) Filed: Oct. 29, 2021

(65) Prior Publication Data

US 2022/0057210 A1 Feb. 24, 2022

Related U.S. Application Data

(63) Continuation of application No. 16/894,717, filed on Jun. 5, 2020, now Pat. No. 11,193,771.

(51) Int. Cl.
*G01C 19/5747* (2012.01)
*G01C 19/5712* (2012.01)
(Continued)

(52) U.S. Cl.
CPC ....... *G01C 19/5747* (2013.01); *G01C 19/574* (2013.01); *G01C 19/5712* (2013.01); *G01C 19/5719* (2013.01)

(58) Field of Classification Search
CPC ............ G01C 19/5747; G01C 19/5712; G01C 19/574; G01C 19/5719
See application file for complete search history.

(56) References Cited

U.S. PATENT DOCUMENTS

| 5,241,861 A | 9/1993 | Hulsing, II |
| 5,392,650 A | 2/1995 | O'Brien et al. |

(Continued)

FOREIGN PATENT DOCUMENTS

| EP | 3 146 294 B1 | 3/2017 |
| EP | 3 282 845 A1 | 2/2018 |

(Continued)

OTHER PUBLICATIONS

Kranz et al., Micromechanical Vibratory Rate Gyroscopes Fabricated in Conventional CMOS. Proc. Symposium Gyro Technology. Deutsche Gesellschaft Fuer Ortung Und Navigation, 1997. Stuttgart, Germany. Sep. 16-17, 1997; pp. 3.0-3.8.

(Continued)

*Primary Examiner* — Helen C Kwok
(74) *Attorney, Agent, or Firm* — Wolf, Greenfield & Sacks, P.C.

(57) ABSTRACT

Columnar multi-axis microelectromechanical systems (MEMS) devices (such as gyroscopes) balanced against undesired linear and angular vibration are described herein. In some embodiments, the columnar MEMS device may comprise at least two multiple-mass columns, each having at least three proof masses and being configured to sense rotation about a respective axis. The motion and mass of the proof masses may be controlled to achieve linear and (Continued)

rotational balancing of the MEMS device. The columnar MEMS device may further comprise one or more modular drive structures disposed alongside each multiple-mass column to facilitate displacement of the proof masses of a respective column. The MEMS devices described herein may be used to sense roll, yaw, and pitch angular rates.

20 Claims, 21 Drawing Sheets

(51) Int. Cl.
  *G01C 19/5719* (2012.01)
  *G01C 19/574* (2012.01)

(56) References Cited

U.S. PATENT DOCUMENTS

| | | |
|---|---|---|
| 5,600,064 A | 2/1997 | Ward |
| 5,635,638 A | 6/1997 | Geen |
| 5,869,760 A | 2/1999 | Geen |
| 6,230,563 B1 | 5/2001 | Clark et al. |
| 6,257,059 B1 | 7/2001 | Weinberg et al. |
| 6,370,937 B2 | 4/2002 | Hsu |
| 6,505,511 B1 | 1/2003 | Geen et al. |
| 6,571,630 B1 | 6/2003 | Weinberg et al. |
| 6,705,164 B2 | 3/2004 | Willig et al. |
| 6,752,017 B2 | 6/2004 | Willig et al. |
| 6,845,668 B2 | 1/2005 | Kim et al. |
| 6,860,151 B2 | 3/2005 | Platt et al. |
| 6,877,374 B2 | 4/2005 | Geen |
| 6,883,361 B2 | 4/2005 | Wyse |
| 7,032,451 B2 | 4/2006 | Geen |
| 7,036,373 B2 | 5/2006 | Johnson et al. |
| 7,204,144 B2 | 4/2007 | Geen |
| 7,222,533 B2 | 5/2007 | Mao et al. |
| 7,227,432 B2 | 6/2007 | Lutz et al. |
| 7,284,429 B2 | 10/2007 | Chaumet et al. |
| 7,287,428 B2 | 10/2007 | Green |
| 7,313,958 B2 | 1/2008 | Willig et al. |
| 7,347,094 B2 | 3/2008 | Geen et al. |
| 7,421,897 B2 | 9/2008 | Geen et al. |
| 7,675,217 B2* | 3/2010 | Delevoye ............... H03H 9/2431 310/309 |
| 8,096,181 B2 | 1/2012 | Fukomoto |
| 8,113,050 B2 | 2/2012 | Acar et al. |
| 8,266,961 B2 | 9/2012 | Kuang et al. |
| 8,322,213 B2 | 12/2012 | Trusov et al. |
| 8,342,023 B2* | 1/2013 | Geiger ............... G01C 19/574 73/504.04 |
| 8,342,025 B2 | 1/2013 | Coronato et al. |
| 8,354,900 B2 | 1/2013 | Cazzaniga et al. |
| 8,453,504 B1 | 6/2013 | Mao |
| 8,459,109 B2 | 6/2013 | Caminada et al. |
| 8,459,110 B2 | 6/2013 | Cazzaniga et al. |
| 8,490,483 B2 | 7/2013 | Wrede et al. |
| 8,539,832 B2 | 9/2013 | Potasek et al. |
| 8,656,776 B2 | 2/2014 | Trusov et al. |
| 8,783,105 B2 | 7/2014 | Kuhlmann et al. |
| 8,794,067 B2* | 8/2014 | Schmid ............... G01C 19/574 73/504.12 |
| 8,844,357 B2 | 9/2014 | Scheben et al. |
| 8,991,247 B2 | 3/2015 | Trusov et al. |
| 9,212,908 B2 | 12/2015 | Geen et al. |
| 9,217,756 B2 | 12/2015 | Simon et al. |
| 9,447,015 B1 | 9/2016 | Wang et al. |
| 9,493,340 B2 | 11/2016 | Mahameed et al. |
| 9,645,166 B2 | 5/2017 | Waters et al. |
| 9,958,271 B2 | 5/2018 | Anac et al. |
| 10,359,284 B2 | 7/2019 | Coronato et al. |
| 10,415,968 B2 | 9/2019 | Prikhodko et al. |
| 10,466,053 B2 | 11/2019 | Ruohio et al. |
| 11,173,771 B2* | 11/2021 | Suzuki ................ B62D 25/16 |
| 11,193,771 B1 | 12/2021 | Gregory et al. |
| 2005/0229705 A1* | 10/2005 | Geen ................ G01C 19/5719 73/514.16 |
| 2006/0213265 A1 | 9/2006 | Weber et al. |
| 2007/0001783 A1* | 1/2007 | Lutz ..................... H03H 9/2431 333/186 |
| 2007/0062282 A1 | 3/2007 | Akashi et al. |
| 2008/0282833 A1 | 11/2008 | Chaumet |
| 2009/0223277 A1 | 9/2009 | Rudolf et al. |
| 2012/0013355 A1 | 1/2012 | Narita et al. |
| 2012/0060604 A1 | 3/2012 | Neul et al. |
| 2012/0210788 A1* | 8/2012 | Gunther ............... G01C 19/574 73/504.12 |
| 2013/0192363 A1 | 8/2013 | Loreck |
| 2013/0269413 A1 | 10/2013 | Tao et al. |
| 2014/0190258 A1 | 7/2014 | Donadel et al. |
| 2014/0260608 A1 | 9/2014 | Lin et al. |
| 2014/0366631 A1 | 12/2014 | Seeger et al. |
| 2015/0285633 A1 | 10/2015 | Kamal Said Abdel Aziz et al. |
| 2015/0330783 A1* | 11/2015 | Rocchi ............... G01C 19/5769 73/504.12 |
| 2016/0025493 A1 | 1/2016 | Stewart |
| 2016/0084654 A1 | 3/2016 | Senkal et al. |
| 2016/0264404 A1 | 9/2016 | Acar |
| 2016/0316146 A1 | 10/2016 | Kajimura |
| 2016/0349056 A1 | 12/2016 | Thompson et al. |
| 2018/0058853 A1* | 3/2018 | Jia ..................... G01C 19/5712 |
| 2018/0172445 A1 | 6/2018 | Prikhodko et al. |
| 2018/0172446 A1 | 6/2018 | Prikhodko et al. |
| 2018/0172447 A1* | 6/2018 | Prikhodko ......... G01C 19/5747 |
| 2018/0209791 A1* | 7/2018 | Chang ................. G01P 15/097 |
| 2021/0381834 A1 | 12/2021 | Gregory et al. |

FOREIGN PATENT DOCUMENTS

| | | |
|---|---|---|
| JP | 2011-145129 A | 7/2011 |
| JP | 2019-502113 A | 1/2019 |
| KR | 20190005196 A | 1/2019 |
| WO | WO 2015/177192 A1 | 11/2015 |
| WO | WO 2017/098453 A1 | 6/2017 |
| WO | WO 2018/057071 A1 | 3/2018 |

OTHER PUBLICATIONS

Kranz, Design, Simulation and Implementation of Two Novel Micromechanical Vibratory-Rate Gyroscopes. Department of Electrical and Computer Engineering. Carnegie Mellon University. May 1988; 41 pages.
Kumar et al., Amplitude modulated Lorentz force MEMS magnetometer with picotesla sensitivity. Journal of Micromechanics and Microengineering. Sep. 20, 2016; 26(10): http://iopscience.iop.org/article/10.1088/0960-1317/26/10/105021/meta#fnref-jmmaa3949bib003.
Li et al., Three-Axis Lorentz-Force Magnetic Sensor for Electronic Compass Applications. Journal of Microelectromechanical Systems. Aug. 2012;21(4):1002 http://ieeexplore.ieee.org/stamp/stamp.jsp?arnumber=6198750.
Park et al., Dynamics and control of a MEMS angle measuring gyroscope. Sensors and Actuators A: Physical 144.1 2008; 56-63.
Prikhodko et al., Foucault Pendulum on a Chip: Angle Measuring Silicon Mems Gyroscope. 2011 IEEE 24th International Conference on Micro Electro Mechanical Systems (MEMS 2011), Cancun, Mexico. Jan. 23-27, 2011;161-4.
Trusov et al., Flat is Not Dead: Current and Future Performance of Si-MEMS Quad Mass Gyro (QMG) System. 2014 IEEE/ION Position, Location and Navigation Symposium. (PLANS 2014). May 5-8, 2014; 7 pages.
Trusov et al., Force Rebalance, Whole Angle, and Self-Calibration Mechanization of Silicon MEMS Quad Mass Gyro. IEEE 2014 International Symposium on Inertial Sensors and Systems (ISISS). Feb. 25-26, 2014;149-50.

(56) References Cited

OTHER PUBLICATIONS

Zaman et al., A Mode-Matched Silicon-Yaw Tuning-Fork Gyroscope With Subdegree-Per-Hour Allan Deviation Bias Instability. Journal of Microelectromechanical Systems 17.6. 2008: 1526-36.

* cited by examiner

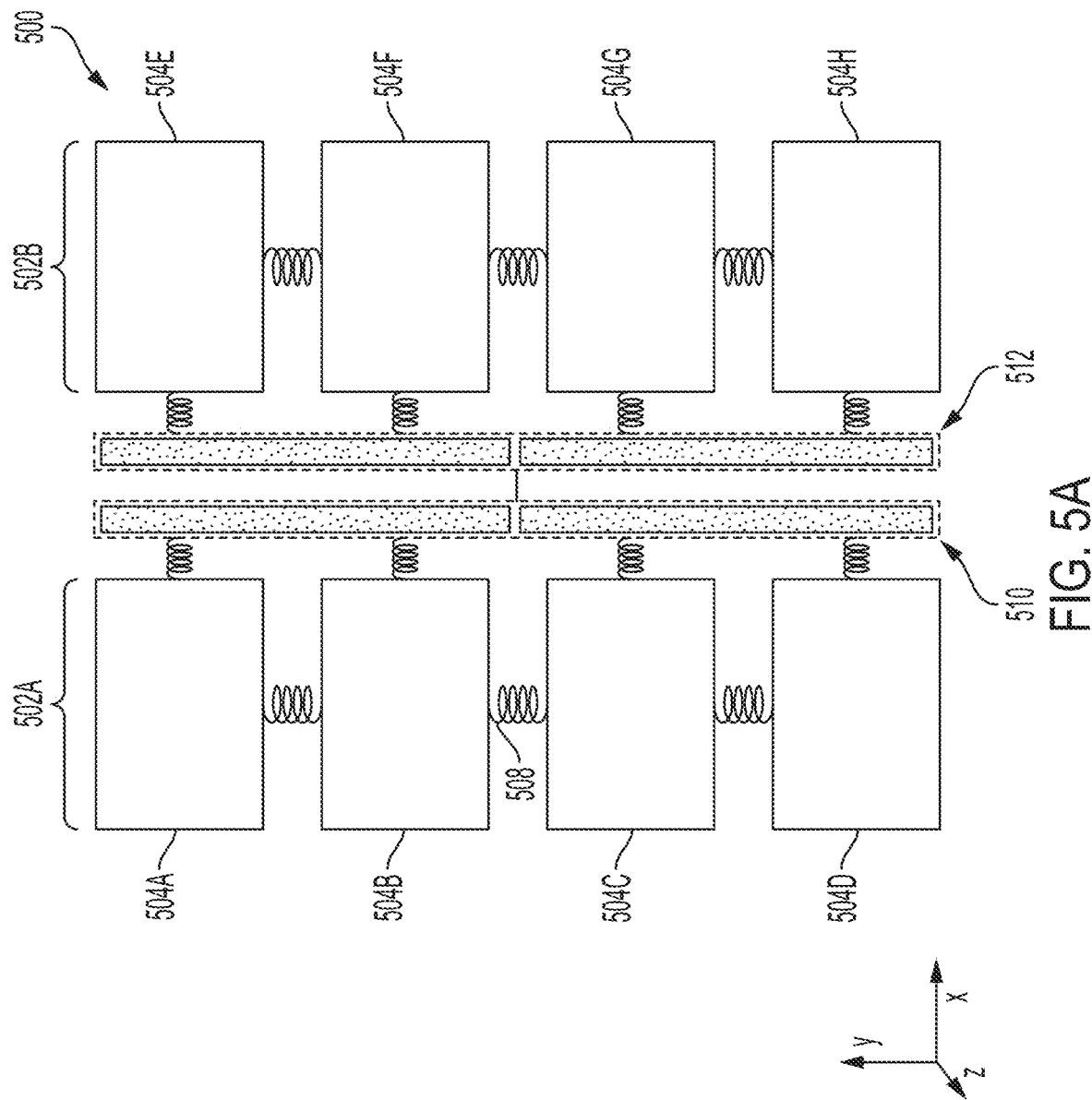

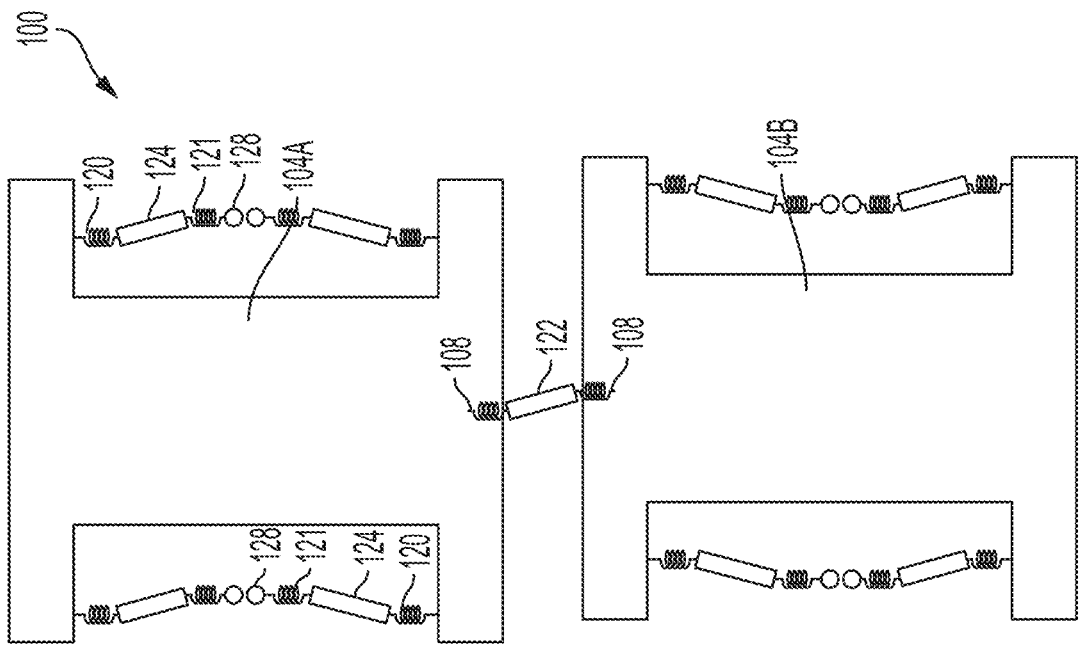
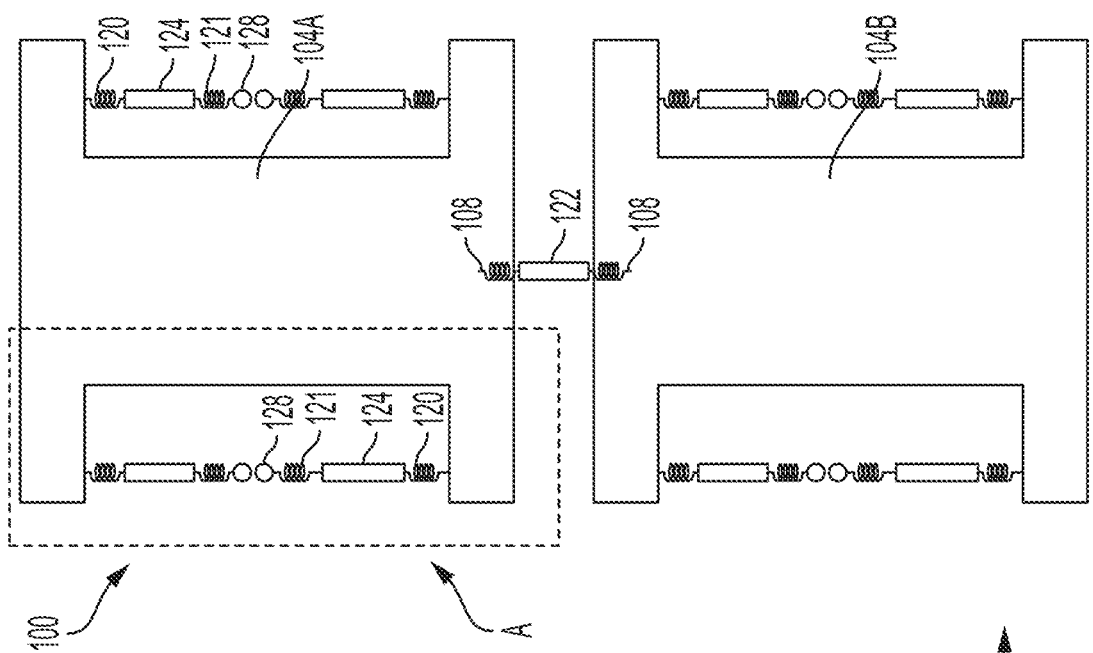

3-AXIS GYROSCOPE WITH ROTATIONAL VIBRATION REJECTION

CROSS-REFERENCE TO RELATED APPLICATIONS

This application is a continuation claiming the benefit under 35 U.S.C. § 120 of U.S. patent application Ser. No. 16/894,717, filed Jun. 5, 2020, and entitled "3-AXIS GYROSCOPE WITH ROTATIONAL VIBRATION REJECTION," which is hereby incorporated herein by reference in its entirety.

FIELD

This disclosure relates to microelectromechanical systems (MEMS) devices, and in particular, MEMS gyroscopes.

BACKGROUND

Gyroscopes (sometimes referred to simply as "gyros") are devices which are sensitive to rotation, and therefore which can be used to detect rotation. Microelectromechanical systems (MEMS) gyroscopes typically include a movable body, sometimes referred to as a "proof mass," to which an electrical signal is applied to produce motion predominantly along a particular axis. This is referred to as driving the proof mass, and the axis along which the proof mass is driven is sometimes referred to as the drive axis. When the gyroscope experiences rotation, the proof mass additionally moves along an axis different than the drive axis, sometimes referred to as the sense axis. For some MEMS gyroscopes, rotation causes the proof mass to move linearly along the sense axis. For others, rotation causes the proof mass to rotate. The motion of the proof mass along the sense axis is detected, providing an indication of the rotation experienced by the gyroscope.

Some MEMS gyroscopes include multiple proof masses that are mechanically coupled together. The proof masses can be coupled together in an attempt to provide synchronous motion while rejecting undesired motion in either the sense or drive axes.

BRIEF SUMMARY

Some embodiments are directed to columnar multi-axis microelectromechanical systems (MEMS) devices (such as gyroscopes) balanced against undesired linear and angular vibration. In some embodiments, the columnar MEMS device may comprise at least two multiple-mass columns, each having at least three proof masses and being configured to sense rotation about a respective axis. The motion and mass of the proof masses may be controlled to achieve linear and rotational balancing of the MEMS device. The columnar MEMS device may further comprise one or more modular drive structures disposed alongside each multiple-mass column to facilitate displacement of the proof masses of a respective column. The MEMS devices described herein may be used to sense roll, yaw, and pitch angular rates.

Some embodiments are directed to a gyroscope, comprising: a first column comprising three proof masses arranged linearly, lying in a first plane, and configured to sense motion about a first axis of rotation; a second column adjacent to the first column, the second column comprising three proof masses arranged linearly, lying in the first plane, and configured to sense motion about a second axis of rotation; and a plurality of drive arrays. The plurality of drive arrays comprises: a first drive array coupled to the first column, the first drive array configured to cause motion of the three proof masses of the first column in the first plane; and a second drive array coupled to the second column and the first drive array, the second drive array configured to cause motion of the three proof masses of the second column in the first plane.

Some embodiments are directed to a microelectromechanical systems (MEMS) device, comprising: a first column comprising three proof masses arranged linearly along a first direction, lying in a first plane, and configured to sense motion about a first axis of rotation; a second column adjacent to the first column comprising three proof masses arranged linearly along the first direction, lying in the first plane, and configured to sense motion about a second axis of rotation; and a first drive array configured to cause in-plane motion of the three proof masses of the first column in the first plane, the first drive array being arranged alongside the three proof masses of first column in the first direction.

Some embodiments are directed to an apparatus, comprising: a first gyroscope comprising three proof masses arranged linearly in a first column and configured to sense motion about a first axis of rotation; a second gyroscope comprising three proof masses arranged linearly in a second column and configured to sense motion about a second axis of rotation. The first and second gyroscopes are disposed side-by-side in a first plane and coupled together by a plurality of drive arrays configured to cause in-plane motion of the three proof masses of the first and second columns in the first plane. The three proof masses of the first column comprise two outer proof masses and an inner proof mass disposed between the two outer proof masses of the first column, wherein the inner proof mass of the first column moves in a direction opposite a direction of motion of the two outer proof masses of the first column. The three proof masses of the second column comprise two outer proof masses and an inner proof mass disposed between the two outer proof masses of the second column, wherein the inner proof mass of the second column moves in a direction opposite a direction of the motion of the two outer proof masses of the second column.

BRIEF DESCRIPTION OF THE DRAWINGS

Various non-limiting embodiments of the technology are described herein with reference to the following figures. It should be appreciated that the figures are not necessarily drawn to scale. Items appearing in multiple figures are indicated by the same reference numeral in all figures in which they appear. For purposes of clarity, not every component may be labeled in every drawing.

FIG. 5A is a top view illustrating schematically an alternative example MEMS device having two multiple-mass columns for sensing rotation about a respective axis, according to some non-limiting embodiments.

FIG. 6A is a top view illustrating schematically an example of a MEMS device having in-line springs, according to some non-limiting embodiments.

FIG. 6B is a top view illustrating schematically the MEMS device of FIG. 6A when driven in the x-axis direction, according to some non-limiting embodiments.

DETAILED DESCRIPTION

Figure 1:
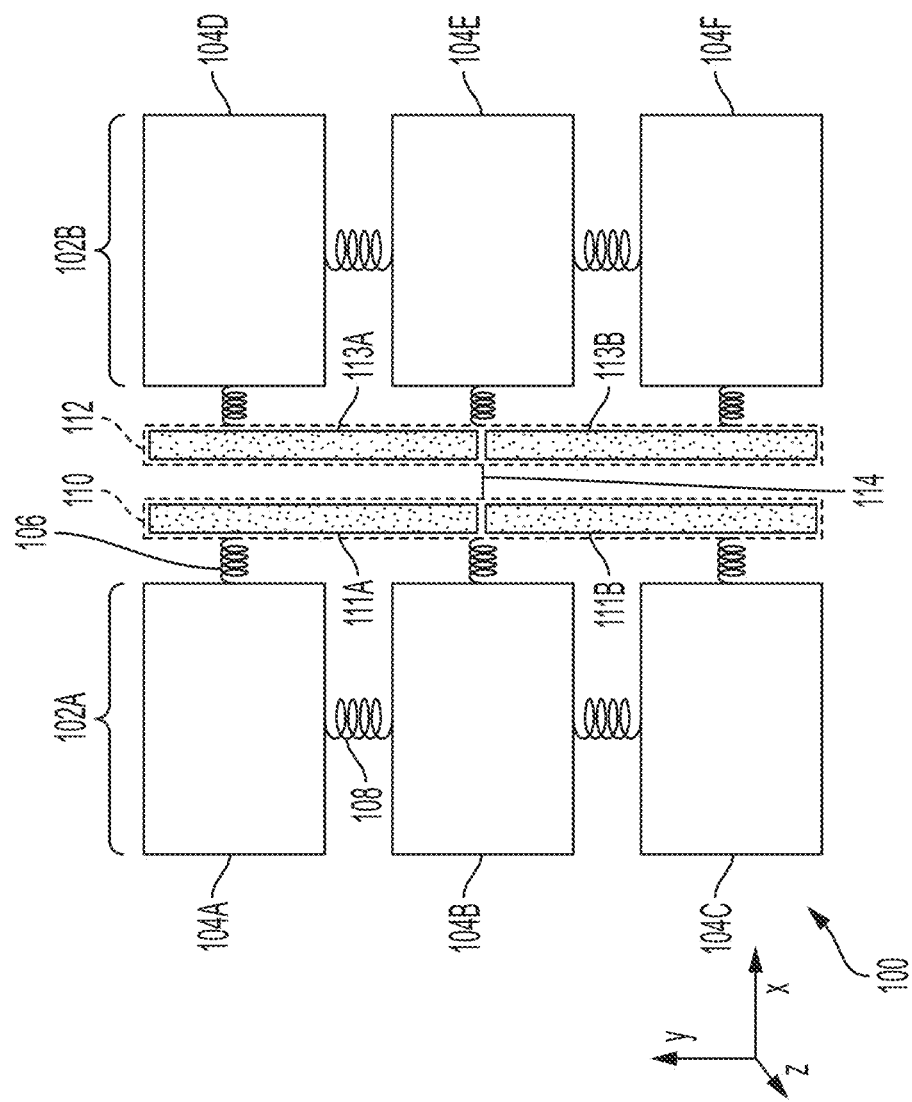
FIG. 1 is a top view illustrating schematically an example microelectromechanical systems (MEMS) device having two multiple-mass columns for sensing rotation about a respective axis, according to some non-limiting embodiments.

Aspects of the present application relate to a microelectromechanical systems (MEMS) device, in particular, a columnar multi-axis gyroscope having three or more moving masses (referred to herein as "proof masses") per column. In some embodiments, the proof masses in each column are configured such that their relative motion provides linear and rotational balance, meaning that the gyroscope rejects linear acceleration and angular vibration about an axis that is not desired for the intended sensing of the gyroscope.

According to an aspect of the present application, the MEMS device (which in some embodiments is a MEMS gyroscope) is configured to sense rotation about two or more axes (e.g., roll, pitch, and/or yaw motion). For example, in some embodiments, the MEMS device may be configured to sense rotation about two axes (e.g., roll and yaw, roll and pitch, or pitch and yaw). In some embodiments, the MEMS device may be configured to sense rotation about three axes (e.g., roll, pitch, and yaw). In particular, the MEMS gyroscope may have multiple columns disposed in a single plane, each column having three or more proof masses arranged linearly along the column. Each column may be configured to sense rotation about a respective axis (e.g., a first column configured to sense roll, a second column configured to sense yaw, and a third column configured to sense pitch). The columns may be coupled together advantageously to achieve desired effects of the MEMS device, as described herein.

According to an aspect of the present application, the MEMS gyroscope comprises multiple "drive arrays"—structures configured to cause motion of proof masses of the gyroscope in a respective column. Each column of the gyroscope may have at least one drive array disposed alongside the column such that each proof mass in the column may be coupled to the drive array by a spring, for example. The coupling configuration of the proof masses to the drive arrays may be configured to reduce quadrature—motion occurring when the drive mode couples to the sense mode of the gyroscope giving rise to erroneous outputs—as described further herein. In some embodiments, each column may have multiple drive arrays disposed alongside the proof masses such that each proof mass in a column may be coupled to two drive arrays, one drive array per each of two opposing sides of the proof mass. The inventors have recognized that configuring the drive arrays alongside each column of proof masses allows for stronger coupling and more direct driving of proof masses. Stronger coupling between the proof masses and drive arrays helps to ensure that the motion of adjacent columns have a fixed drive motion ratio, regardless of changes in environmental conditions or variation in fabrication. In some embodiments, the fixed ratio is 1:1:1 for a three-column MEMS gyroscope.

According to a further aspect of the present application, the inventors have developed a MEMS device having modular drive structures allowing for simpler design and manufacture of the MEMS device, as described herein. For example, each drive array of the MEMS gyroscope may have multiple "drive modules", with one or more drive modules coupled to a proof mass of a column. In some embodiments, two drive modules per drive array are coupled to a proof mass and therefore each proof mass is effectively coupled to four drive modules. In some embodiments, more than two drive modules per drive array are coupled to each proof mass.

The inventors have recognized that configuring the MEMS gyroscope with at least two drive modules per drive array is advantageous as it allows for net-zero momentum of the drive arrays. In particular, each of the drive modules may be configured to move along a same axis, regardless of what direction the proof masses coupled to each drive array are to be driven in. The configuration of the springs which couple the proof masses to the drive modules may allow for displacement of the proof masses along a desired axis for a respective column, while each of the drive modules in all columns of the MEMS device move along the same axis. By configuring each drive array with at least two drive modules, drive modules of a respective drive array may be configured to move in opposite directions along the same axis to achieve net zero momentum of the drive arrays.

A further aspect of the application includes coupling drive modules of adjacent drive arrays together. In some embodiments, each of the drive modules of each drive array move along a same axis (e.g., the y-axis). The inventors have recognized that it may be advantageous to dispose adjacent to each other columns having drive arrays with drive modules that move in-phase (e.g., with the same amplitude and frequency along the y-axis). In this manner, adjacent drive modules moving in-phase may be rigidly coupled together. For example, as will be described further herein, in some embodiments, the "roll" column is disposed adjacent the "yaw" column for advantageous coupling of adjacent drive modules.

The inventors have further recognized that a disadvantage of conventional gyroscopes is their vulnerability to linear and rotational vibrations which cause inaccuracies in the sensing ability of the gyroscope. Where a gyroscope is not rotationally balanced, rotational motion may cause adjacent proof masses to pivot around their center of mass. Where the system is not linearly balanced, linear motion may cause inadvertent motion of the proof masses in the sense direction. Both of these types of vibrations may indicate rotation even in the absence of rotation around the measured axis. Therefore, an aspect of the present application is a multi-axis columnar gyroscope that is balanced for linear and rotational vibrations.

For example, as described herein, the MEMS gyroscope may comprise two or more columns. Each column may have three or more proof masses arranged linearly along the respective column. The inventors have recognized that linear and rotational balancing of the gyroscope may be achieved so as to reject both linear and rotational vibrations by controlling the number, mass, and motion of proof masses in each column. In particular, the at least three proof masses of each column may be configured to move differentially. As will be described further herein, each column of the MEMS gyroscope has two outer masses and at least one inner mass. The inventors have recognized that rotational balancing may not be achieved by antiphase motion of the proof masses alone, but rather, to achieve rotational balancing of the MEMS gyroscope, the inner mass is configured to move in a first direction linearly opposite the motion of the two outer masses. In some embodiments, the MEMS gyroscope has four proof masses per column—two inner masses and two outer masses—and the two inner masses move together in the first direction linearly opposite the motion of the two outer masses.

The inventors have further recognized that, to achieve linear balancing, the effective mass, per column, of the proof masses moving in the first direction may be balanced against the effective mass moving opposite the first direction. In other words, each column may be constructed to have a balanced "modal mass"—or balanced displacement of mass. In some embodiments, the effective mass moving in the first direction is equal to the effective mass moving opposite the first direction. In other embodiments, the effective mass in each direction is balanced for a desired displacement ratio of the proof masses.

Accordingly, some embodiments provide for a gyroscope, comprising: a first column comprising three proof masses arranged linearly, lying in a first plane, and configured to sense motion about a first axis of rotation; a second column adjacent to the first column, the second column comprising three proof masses arranged linearly, lying in the first plane, and configured to sense motion about a second axis of rotation; and a plurality of drive arrays, the plurality of drive arrays comprising: a first drive array coupled to the first column, the first drive array configured to cause motion of the three proof masses of the first column in the first plane; and a second drive array coupled to the second column and the first drive array, the second drive array configured to cause motion of the three proof masses of the second column in the first plane.

In some embodiments a microelectromechanical systems (MEMS) device is provided, the MEMS device comprising: a first column comprising three proof masses arranged linearly along a first direction, lying in a first plane, and configured to sense motion about a first axis of rotation; a second column adjacent to the first column comprising three proof masses arranged linearly along the first direction, lying in the first plane, and configured to sense motion about a second axis of rotation; and a first drive array configured to cause in-plane motion of the three proof masses of the first column in the first plane, the first drive array being arranged alongside the three proof masses of first column in the first direction.

In some embodiments there is provided an apparatus, comprising: a first gyroscope comprising three proof masses arranged linearly in a first column and configured to sense motion about a first axis of rotation; a second gyroscope comprising three proof masses arranged linearly in a second column and configured to sense motion about a second axis of rotation; wherein: the first and second gyroscopes are disposed side-by-side in a first plane and coupled together by a plurality of drive arrays configured to cause in-plane motion of the three proof masses of the first and second columns in the first plane; the three proof masses of the first column comprise two outer proof masses and an inner proof mass disposed between the two outer proof masses, wherein the inner proof mass of the first column moves in a direction opposite a direction of motion of the two outer proof masses of the first column; and the three proof masses of the second column comprise two outer proof masses and an inner proof mass disposed between the two outer proof masses of the second column, wherein the inner proof mass of the second column moves in a direction opposite a direction of the motion of the two outer proof masses of the second column.

The aspects and embodiments described above, as well as additional aspects and embodiments, are described further below. These aspects and/or embodiments may be used individually, all together, or in any combination, as the technology is not limited in this respect.

FIG. 1 is a top view illustrating schematically an example microelectromechanical systems (MEMS) device having two multiple-mass columns for sensing rotation about a respective axis, according to some non-limiting embodiments. It should be appreciated that FIG. 1 and some subsequent figures shown herein represent simplified block diagrams schematically illustrating the MEMS device. Additional details of components of the MEMS device are shown in subsequent figures. Further, the MEMS devices described herein may have one or more additional features not shown in the illustrated embodiments.

As shown in FIG. 1, an example MEMS device 100 is provided having two columns—a first column 102A and a second column 102B—arranged in a same plane (the plane of the page in this example). Each column of the MEMS device 100 may be configured to sense rotation about a distinct axis (e.g., roll, pitch, and/or yaw). For example, in some embodiments, the first column 102A is configured to sense roll rotation and the second column 102B is configured to sense yaw rotation. It should be appreciated that the respective columns of the MEMS device 100 may be configured to sense rotation about any suitable axis, and aspects of the technology are not limited in this respect. In some embodiments, one or more of the first and second columns 102A-102B may be configured to sense rotation about more than one axis. For example, in some embodiments, the first column 102A may be configured to sense roll and yaw rotation, and the second column 102B may be configured to sense pitch rotation. Although in the illustrated embodiment, the MEMS device 100 is shown having two columns, MEMS devices described herein may comprise more than two columns, for example, having three columns with each column being configured to sense rotation about a distinct axis, as will be described further herein, for example, with respect to FIG. 4A.

The MEMS device 100 may comprise at least three proof masses per column. For example, the first column 102A may have proof masses 104A-104C and the second column 102B may have proof masses 104D-104F. Each of the proof masses 104A-104F may be suspended above an underlying substrate (not shown), and may be configured to detect angular rates through detection of Coriolis forces. The Coriolis effect, and hence a Coriolis force, arises when: 1) a proof mass oscillates; and 2) the gyroscope is subjected to angular motion. In this example, proof masses 104A-104C of the first column 102A may be driven to oscillate along the x-axis, and a Coriolis force arises when the proof mass undergoes angular motion about the y-axis causing the proof masses 104A-104C of the first column 102A to be displaced out-of-plane along the z-axis. The MEMS device 100 may be configured to sense the out-of-plane displacement of the proof masses 104A-104C to measure rotation. All of the proof masses of a respective column may be configured to sense rotation about a common axis. For example, each of the proof masses 104A-104C of the first column 102A may be configured to sense rotation about the y-axis (i.e., about the roll axis in this non-limiting example). Although in the illustrated embodiment, the MEMS device 100 has three proof masses per column, in some embodiments, the MEMS device may comprise more than three proof masses per column, for example, having four proof masses per column, as will be described further herein, for example with respect to FIG. 5A.

As shown in the embodiment illustrated in FIG. 1, the proof masses of a respective column may be arranged linearly and coupled together, for example, by springs 108. For example, each column comprises two outer proof masses 104A and 104C, and 104D and 104F and one inner proof mass, 104B, 104E, respectively. The inner proof mass may be flexibly coupled to each of the outer proof masses such that the inner proof mass may move in a direction opposite the outer proof masses to achieve rotational and linear balancing, as described further herein, for example, with respect to FIG. 2. Further description of the coupling between proof masses, including description of springs 108, is provided herein, for example, with respect to FIG. 6A.

Each column of the MEMS device 100 may have at least one drive array 110, 112 arranged alongside the column of proof masses. Each drive array may be coupled to an underlying substrate (not shown) and caused to move. The proof masses 104A-104F move by virtue of their coupling to the drive arrays 110, 112 as described herein. For example, motion of the first drive array 110 may cause proof masses 104A-104C to move by virtue of the springs 106 coupling the proof masses 104A-104C to the first drive array 110. Similarly, motion of the second drive array 112 may cause proof masses 104D-104F to move by virtue of the springs 106 coupling the proof masses 104D-104F to the second drive array 112. Although in the illustrated embodiment, each column of the MEMS device 100 is shown being coupled to a single drive array, in some embodiments, each column may be coupled to multiple drive arrays, for example, to a pair of drive arrays as described further herein, for example, with respect FIG. 3.

The inventors have recognized that it is advantageous to configure the drive arrays of the MEMS device 100 alongside a respective column of proof masses to allow for stronger coupling of each proof mass to the respective drive array and thus more direct driving of the proof masses by the respective drive array. For example, disposing first drive array 110 alongside the first column 102A allows for direct coupling of each of the proof masses 104A-104C to the first drive array 110, including inner proof mass 102B, while alternative arrangements, such as disposing the first drive array 110 perpendicular to the first column 102 may only allow for direct coupling of no more than two proof masses to the first drive array 110 (e.g., one of the outer proof masses 104A, 104C). As described herein, stronger coupling between the proof masses and drive arrays helps to ensure that the motion of adjacent columns have a fixed drive motion ratio. Although in the illustrated embodiment, each proof mass is coupled to a respective drive array, in some embodiments, one or more proof masses of a respective column may not be coupled directly to a drive array of the respective column, and aspects of the technology described herein are not limited in this respect.

Each of the proof masses of the MEMS device 100 may be driven by the drive arrays at substantially the same frequency. In doing so, the same amplitude motion is exhibited by all proof masses. The MEMS device 100 is therefore configured such that all of the proof masses of the MEMS device 100 are responsive to the same drive frequency. Coupling between proof masses and drive arrays, for example by springs 108, ensures that proof masses of the MEMS device 100 move a same amplitude for a given frequency. However, in some embodiments the MEMS device 100 may be coupled such that the ratio between drive force and amplitude of motion among respective proof masses is not equal but is proportional. In some embodiments, proof masses of the respective columns are excited by different drive modes with different frequencies.

As shown in FIG. 1, each of the first and second drive arrays 110, 112 comprise at least two drive modules per drive array. For example, first drive array 110 comprises a first drive module 111A and second drive module 111B and second drive array 112 comprises first drive module 113A and second drive module 113B. As described herein, each of the drive arrays of the MEMS device 100 may be configured to move along a same axis when driving the proof masses of the MEMS device 100, regardless of the particular direction a column of proof masses is to be driven in. For example, proof masses 104A-104C of the first column 102A may be configured to be driven in a direction along the x-axis, as described herein while, in some embodiments, the proof masses 104D-104F of the second column 102B may be configured to be driven in a direction along the y-axis. Meanwhile, each of the drive modules 111A-111B, 113A-

113B may be configured to move in directions along the y-axis. Motion of the proof masses 104A-104F along a particular direction may be enabled by configuration of the springs 106 coupling the proof masses 104A-104F to respective first and second drive arrays 110, 112.

The inventors have recognized that configuring each of the drive arrays 110, 112 with at least two drive modules 111A-111B, 113A-113B, respectively, enables net-zero momentum of the drive arrays 110, 112. For example, first drive module 111A and second drive module 111B may be configured to move in opposite directions along the y-axis, while, first drive module 113A and second drive module 113B are likewise configured to move in opposite directions along the y-axis, allowing for net-zero momentum of each of the first and second drive arrays 110, 112 of the MEMS device 100.

The inventors have appreciated that configuring the drive arrays having multiple drive modules, and configuring the motion of each of the drive modules along a same axis, allows for enhanced modularity of the MEMS device 100, thus enabling simpler manufacturing of the MEMS device 100 at large scales. Although in the illustrated embodiment drive arrays of the MEMS device 100 are shown having two drive modules, in other embodiments, drive arrays of the MEMS device 100 comprise more than two drive modules. For example, in some embodiments, drive arrays of the MEMS device 100 comprise at least two drive modules per proof mass (e.g., six drive modules per drive array where each column comprises three proof masses). Further aspects of the drive arrays and drive modules are described herein, for example, with respect to FIGS. 7A-7C.

Drive arrays of the MEMS device 100 may be coupled together to effectively couple the first and second columns 102A-102B of the MEMS device 100 together. For example, in FIG. 1, a coupler 114 is provided for coupling first drive array 110 to second drive array 112. In some embodiments, the coupler 114 is flexible, for example, comprising a spring, while in other embodiments, the coupler 114 is rigid. In some embodiments, the MEMS device 100 may comprise multiple couplers 114 coupling the first and second drive arrays 110, 112 together, for example, having one or more couplers 114 between each adjacent drive modules of the first and second drive arrays 110, 112. In some embodiments, coupler 114 comprises one or more flexible couplers and one or more rigid couplers for coupling first and second drive arrays 110, 112. Further aspects of coupling between adjacent drive modules are described herein, for example, with respect to FIGS. 9A-9C.

Figure 2:
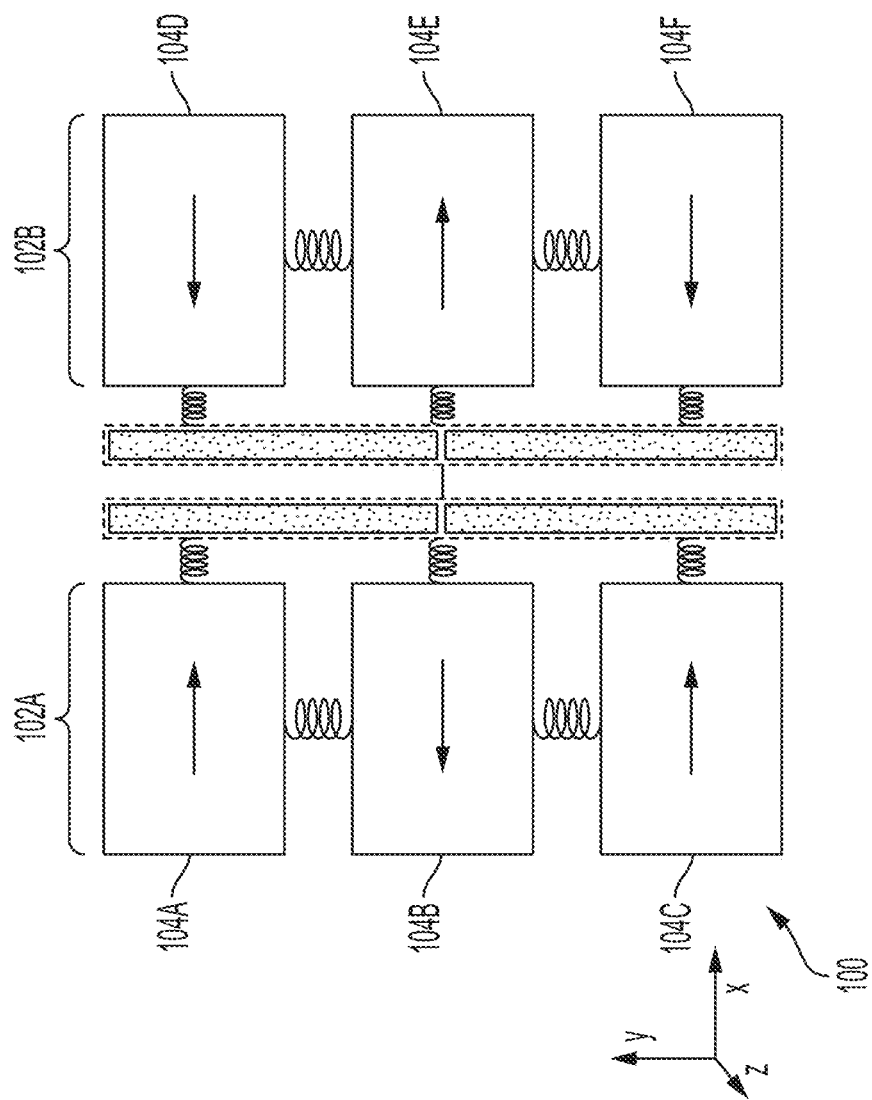
FIG. 2 illustrates relative motion of the proof masses of the example MEMS device of FIG. 1, according to some non-limiting embodiments.

As described herein, the inventors have developed a MEMS gyroscope which is configured to reject unwanted linear and rotational vibrations. The inventors have recognized that to achieve linear balancing, each column of the MEMS device 100 may comprise a proportional (e.g., equal) amount of mass moving in opposite directions along a same axis. Further, the inventors have recognized that to achieve rotational balancing, each column of the MEMS device 100 may comprise at least three proof masses disposed linearly with outer masses moving in an opposite direction relative to the motion of the inner mass(es). FIG. 2, therefore, illustrates relative motion of the proof masses of the example MEMS device of FIG. 1, according to some non-limiting embodiments.

In the illustrated embodiment, proof masses 104A-104F of first and second columns 102A-102B are driven by first and second drive arrays 110, 112, respectively, in directions along the x-axis. For example, the first column 102A may be configured for sensing roll rotation (i.e. rotation about the y-axis in this example), and therefore proof masses 104A-104C may be driven in the x-direction and the MEMS device 100 may be configured to sense motion of the proof masses 104A-104C out-of-plane along the z-axis caused by roll rotation. The second column 102B may be configured for sensing yaw rotation (i.e., rotation about the z-axis), and therefore proof masses 104D-104F may be driven in the x-direction and the MEMS device 100 may be configured to sense motion of the proof masses 104D-104F along the y-axis caused by yaw rotation.

To achieve rotational balancing, the inner mass of each column is configured to move in a direction opposite the motion of outer proof masses. For example, in the illustrated embodiment, outer masses 104A, 104C of the first column 102A are driven to the right, along the x-axis, when an inner mass 104B of the first column 102A is driven to the left, along the x-axis, as shown by the arrows in FIG. 1. Likewise, outer masses 104D, 104F of the second column 102B are driven to the left, along the x-axis, when an inner mass 104E is driven to the right, along the x-axis. Rotational balancing of the MEMS device 100 ensures that unwanted rotational vibration does not couple into sense modes of the gyroscope and cause inaccurate sensing of rotation about a particular axis.

To achieve linear balancing, the MEMS device 100 may have a balanced (e.g., proportional) amount of mass moving in opposite directions. For example, the first column 102A in FIG. 1 may have a balanced amount of mass moving left and right. In particular, outer masses 104A, 104C of the first column 102A may have a first mass, m, and inner mass, 104B, may have a second mass, 2 m, twice as large as the mass of each of the outer masses 104A, 104C such that the total mass moving to the left is 2 m, which is equal to the total mass moving to the right. In other embodiments, the masses of the inner and outer proof masses of a respective column may not be equal, but may be balanced based on desired displacement ratio of the proof masses in a column.

The inventors have recognized that the concept of linear and rotational balancing may be extended to gyroscopes having more than three proof masses per column, e.g. four proof masses per column. Furthermore, the concept of rotational balancing may be extended to gyroscopes sensing more than two axes, e.g. three axes, for example with a gyroscope having three columns of three of more proof masses, examples of which are provided herein.

Figure 3:
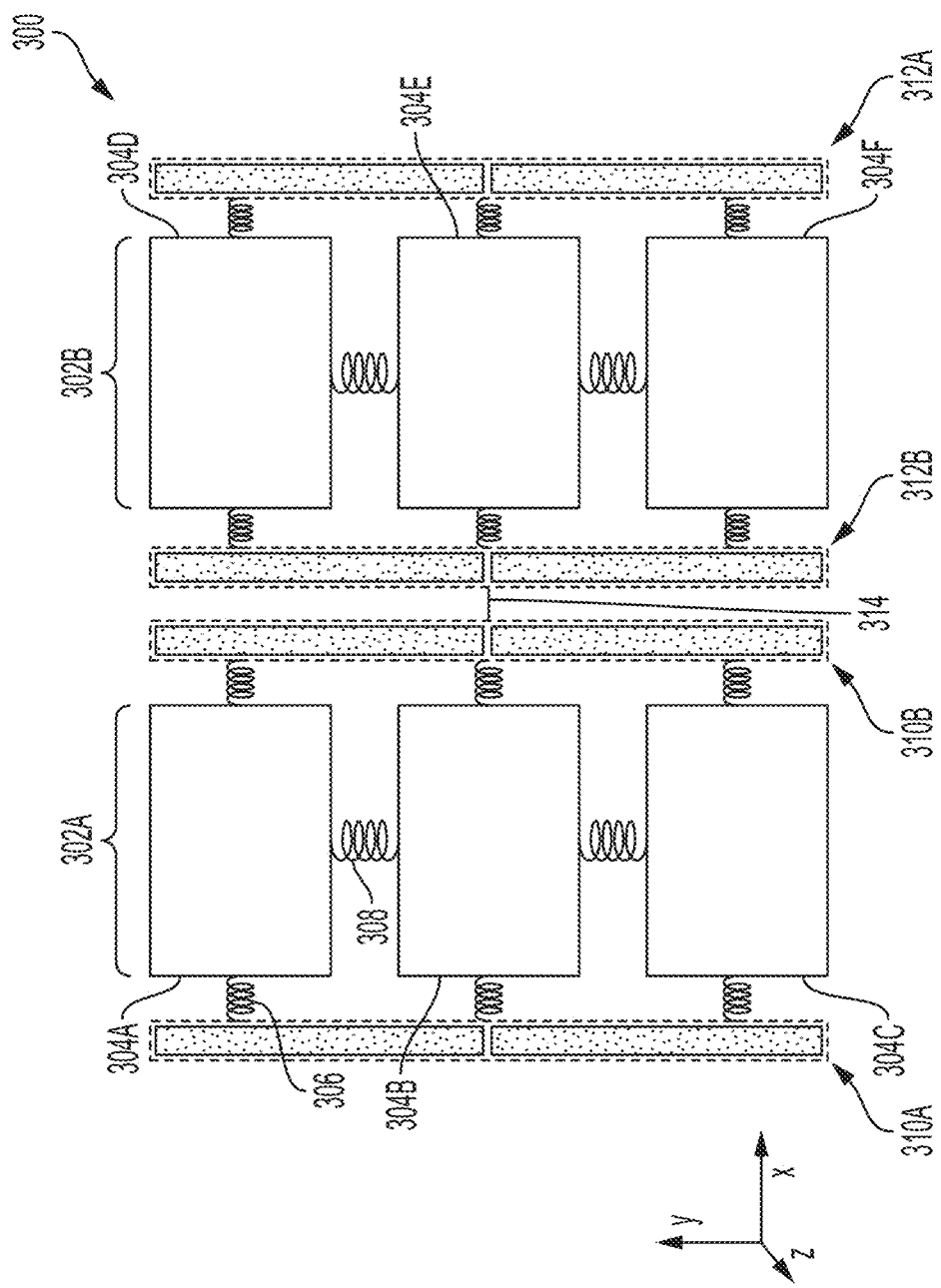
FIG. 3 illustrates the example MEMS device of FIG. 1 having a pair of drive arrays coupled to each multiple-mass column, according to some non-limiting embodiments.

FIG. 3 illustrates the example MEMS device of FIG. 1 having a pair of drive arrays coupled to each multiple-mass column, according to some non-limiting embodiments. As described herein, the inventors have recognized that configuring the MEMS device with a pair of drive arrays per column such that one drive array is coupled to a respective side of each multiple-mass column may be advantageous as it may provide for stronger coupling of the components of the MEMS device (e.g., stronger coupling between the proof masses in a respective column), as well as allow for more direct driving of each proof mass by the drive arrays. Accordingly, FIG. 3 illustrates one embodiment of a MEMS device 300 having two columns—a first column 302A and a second column 302B—arranged in a same plane, each column having a drive array arranged alongside each of first and second sides of the column.

The MEMS device 300 may be configured in the same manner as MEMS device 100 provided in FIG. 1. For example, each of the first and second columns 302A-302B of MEMS device 300 may comprise three proof masses 304A-304C, 304D-304F per column, and each column 302A-302B may be configured to sense rotation about a distinct axis using the proof masses 304A-304F. Furthermore, proof masses 304A-304F of the first and second columns 302A-302B may be linearly arranged and each proof mass may be coupled to one or more other proof masses of the respective columns, for example, by one or more springs 308.

FIG. 3 illustrates one example of a MEMS device having multiple drive arrays per column of proof masses. For example, the first column 302A is arranged having two drive arrays—an outer drive array 310A arranged alongside a left side of the first column 302A, and an inner drive array 310B arranged alongside a right side of the first column. In addition, the second column 302B comprises an outer drive array 312A arranged alongside a right side of the second column 302B, and an inner drive array 312B arranged alongside a left side of the second column 302B.

In some embodiments, each proof mass of the first and second columns 302A, 302B is coupled to both an inner and an outer drive array. For example, proof masses 304A-304C are coupled to the outer drive array 310A on a left side of the first column 302A, and to the inner drive array 310B on a right side of the first column 302A, by, for example, one or more springs 306. Likewise, proof masses 304D-304F of the second column 302B are each coupled to outer and inner drive arrays 312A, 312B by springs 306. Like the MEMS device 100 shown in FIG. 1, the drive arrays 310A, 310B, 312A, 312B of MEMS device 300 may be coupled to an underlying substrate (not shown) and caused to move, and the proof masses 304A-304F may move by virtue of their coupling to the drive arrays 310A, 310B, 312A, 312B. As described herein, adjacent drive arrays of a MEMS device may be coupled together. For example, inner drive arrays 310B and 312B are configured being coupled together, for example, by coupler 314.

Figure 4A:
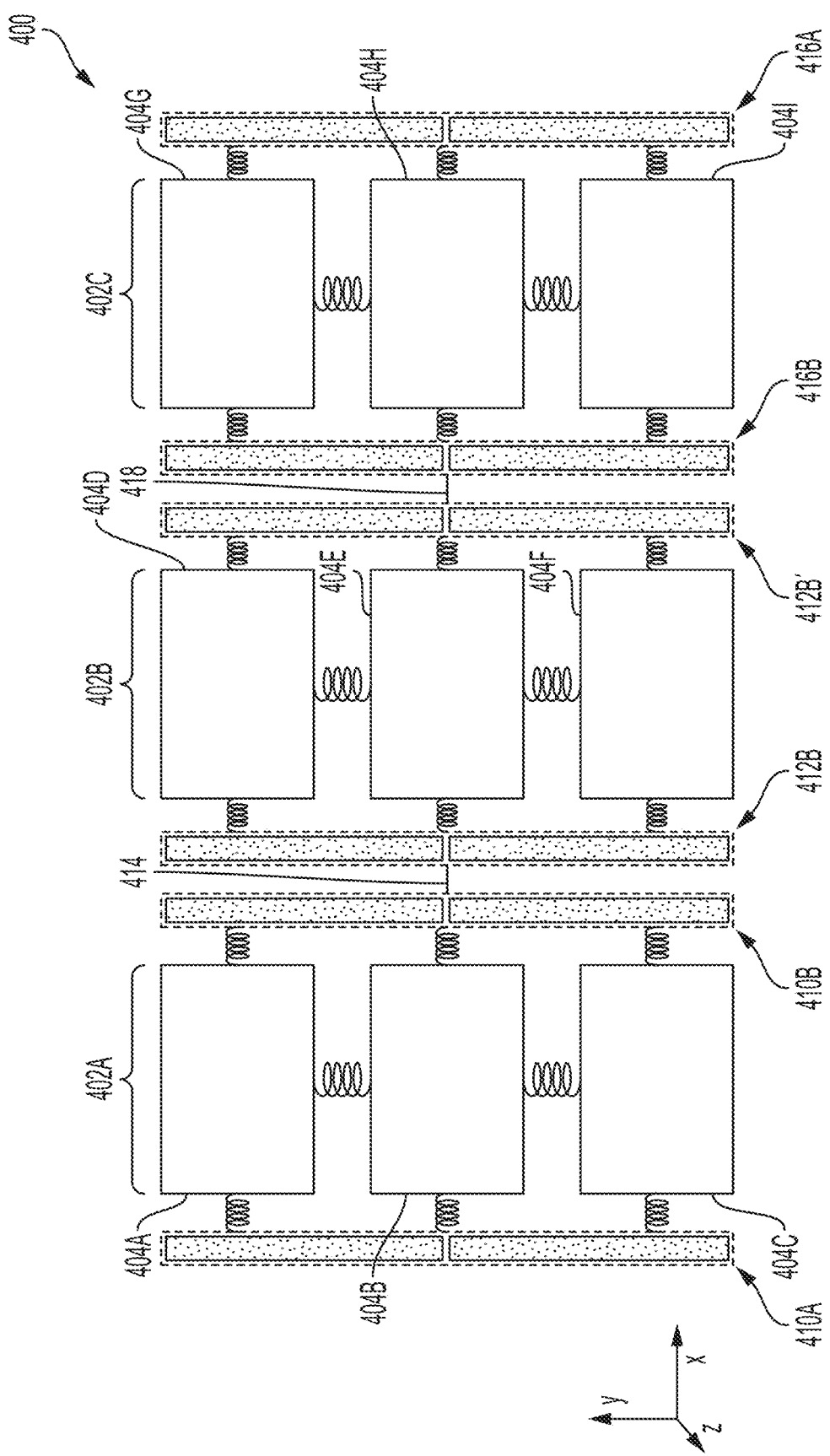
FIG. 4A illustrates the example MEMS device of FIG. 3 having a third multiple-mass column for sensing rotation about an additional axis, according to some non-limiting embodiments.

FIG. 4A illustrates the example MEMS device of FIG. 3 having a third multiple-mass column for sensing rotation about an additional axis, according to some non-limiting embodiments. As described herein, a MEMS device may comprise three columns, each column sensing rotation about a respective axis. For example, a first column may sense roll rotation, a second column may sense yaw rotation, and a third column may sense pitch rotation. This arrangement of columns (roll-yaw-pitch) may be advantageous given the behavior of the drive arrays and drive modules, as described further herein. However, in other embodiments, respective columns of the MEMS device may be configured in any suitable way, for example, in a roll-pitch-yaw or yaw-roll-pitch configuration, among other embodiments.

The MEMS device 400 illustrated in FIG. 4A may be configured in the same manner as the MEMS devices described herein, for example MEMS devices 100 and 300, except that the MEMS device 400 includes an additional multiple-mass column 402C. Likewise, the third column 402C of MEMS device 400 may be configured in much the same manner as first and second columns 402A-402B. For example, the third column 402C may comprise three proof masses 404G-404I coupled to outer and inner drive arrays 416A, 416B such that proof masses 404G-404I are caused to move by virtue of their coupling to drive arrays 416A, 416B.

As shown in FIG. 4A, each of the first, second, and third columns 402A-404C may be arranged alongside each other in a same plane and each column may be configured to detect rotation about a respective axis. The inventors have recognized that such a configuration provides a compact gyroscope which is configured to sense rotation in three-dimensions.

As described herein, the respective columns of the MEMS device may be coupled together by virtue of the drive arrays. For example, adjacent drive arrays 410B, 412B and 412B', 416B may be coupled together, for example, by couplers 414, 418, to effectively couple the first, second, and third columns 402A, 402B, 402C together. In some embodiments, couplers 414, 418 are flexible, for example, comprising a spring, while in other embodiments, couplers 414, 418 are rigid. In some embodiments, each of the couplers 414, 418 may comprise multiple couplers for coupling adjacent drive modules. In some embodiments, as described further herein, one or more of each of multiple couplers 414, 418 may be flexible, while one or more of multiple couplers 414, 418 may be rigid.

Figure 4B:
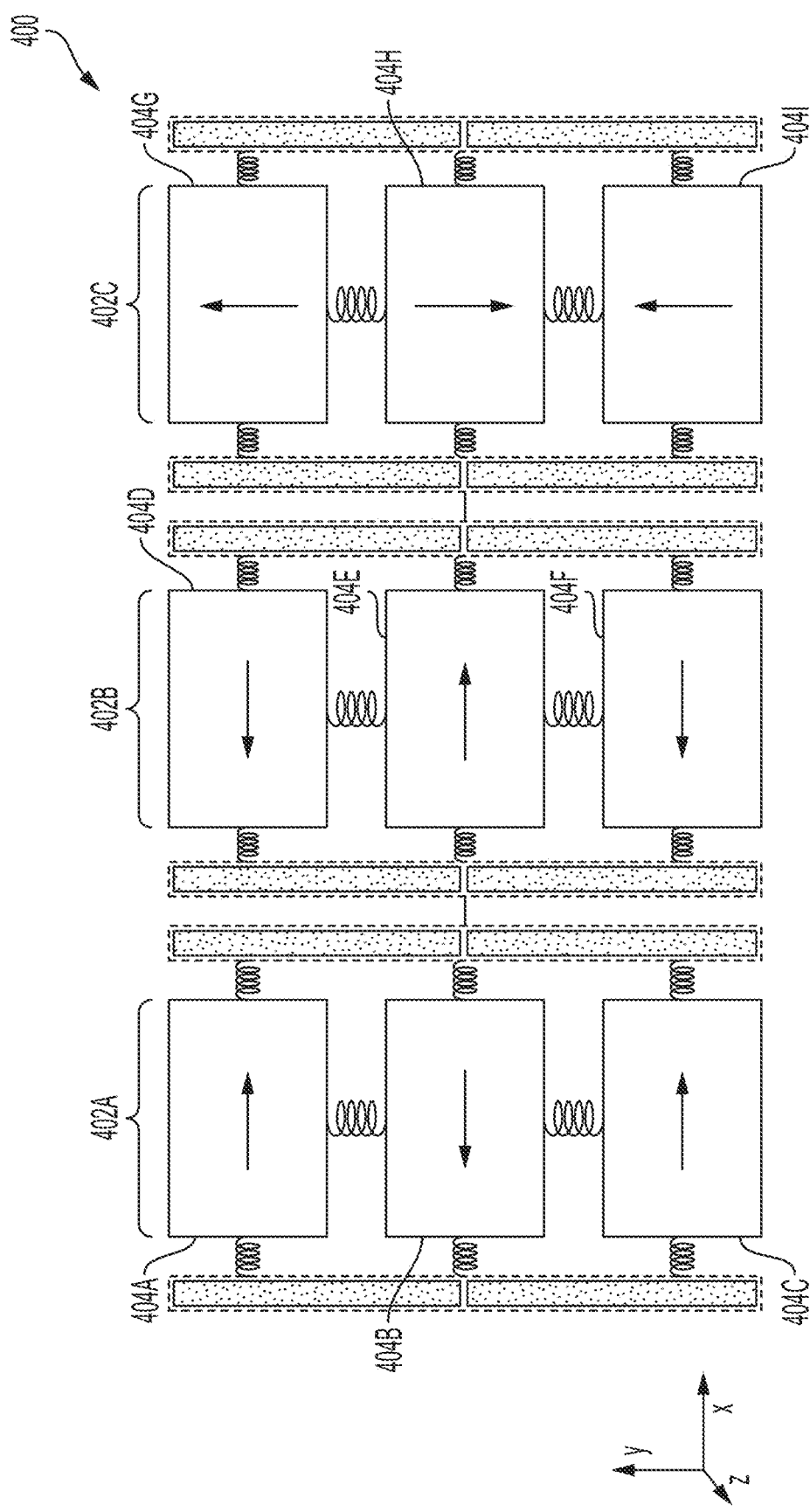
FIG. 4B illustrates the relative motion of proof masses of the example MEMS device of FIG. 4A, according to some non-limiting embodiments.

FIG. 4B illustrates the relative motion of proof masses of the example MEMS device of FIG. 4A, according to some non-limiting embodiments. As described herein, the first, second, and third columns 402A, 402B, 402C of the MEMS device 400 may be configured to sense roll, yaw, and pitch rotation, respectively. For example, the first column 402A may be configured for sensing roll rotation (i.e. rotation about the y-axis in this example), and therefore proof masses 404A-404C may be driven in the x-direction and the MEMS device 400 may be configured to sense motion of the proof masses 404A-404C out-of-plane along the z-axis caused by roll rotation. The second column 402B may be configured for sensing yaw rotation (i.e., rotation about the z-axis in this example), and therefore proof masses 404D-404F may be driven in the x-direction and the MEMS device 400 may be configured to sense motion of the proof masses 404D-404F along the y-axis caused by yaw rotation. The third column 402C may be configured for sensing pitch rotation (i.e. rotation about the x-axis in this example), and therefore proof masses 404G-404I may be driven in the y-direction and the MEMS device may be configured to sense motion of the proof masses 404G-404I out-of-plane along the z-axis caused by pitch rotation.

Furthermore, the MEMS device 400 may be configured to reject unwanted linear and rotation vibrations. As described herein, the inventors have recognized that the concepts of linear and rotational balancing described herein with respect to MEMS device 100, for example, may be extended to gyroscopes sensing in three axes of rotation. The inventors have recognized that to achieve linear balancing, each column of the MEMS device 400 may comprise an equal amount of mass moving in opposite directions along the same axis. Further, the inventors have recognized that to achieve rotational balancing, each column of the MEMS device 400 may comprise at least three proof masses disposed linearly with outer proof masses moving in opposite directions relative to the motion of the inner proof mass(es).

In the embodiment illustrated in FIG. 4B, outer proof masses 404A, 404C of the first column 402A are configured to move in a direction along the x-axis opposite the direction of motion of inner proof mass 404B—for example, outer masses 404A, 404C move right when inner mass 404B moves to the left. Likewise, outer proof masses 404D, 404F of the second column are configured to move in a direction along the x-axis opposite the direction of motion of inner proof mass 404E—for example, outer masses 404D, 404F move left when inner mass 404E moves to the right. For the third column 402C, outer proof masses 404G, 404I are configured to move in a direction along the y-axis opposite the direction of motion of inner proof mass 404H—for example, outer masses 404G, 404I move up when inner mass 404H moves down. The inventors have recognized that such a configuration enables rotational balancing of the three-axis MEMS device 400 such that unwanted rotational vibration experienced by the MEMS device 400 is rejected. Linear balancing may also be achieved for the MEMS device 400 by balancing the mass of the outer masses of each column, with the mass of the inner mass of each column, respectively, as described herein.

According to another aspect of the technology described herein, a columnar multi-axis gyroscope is provided having four proof masses per column. For example, FIG. 5A is a top view illustrating schematically an alternative example MEMS device having two multiple-mass columns for sensing rotation about a respective axis, according to some non-limiting embodiments.

The MEMS device 500 shown in FIG. 5A may be configured in much the same manner as the MEMS devices described herein, except that each of the first and second columns 502A, 502B of the MEMS device 500 comprise four proof masses. In particular, first column 502A may comprise four proof masses 504A-504D, and second column 502B may comprise four proof masses 504E-504H. Each of the proof masses 504A-504H may be coupled to at least one adjacent drive array 511A, 513A.

Figure 5B:
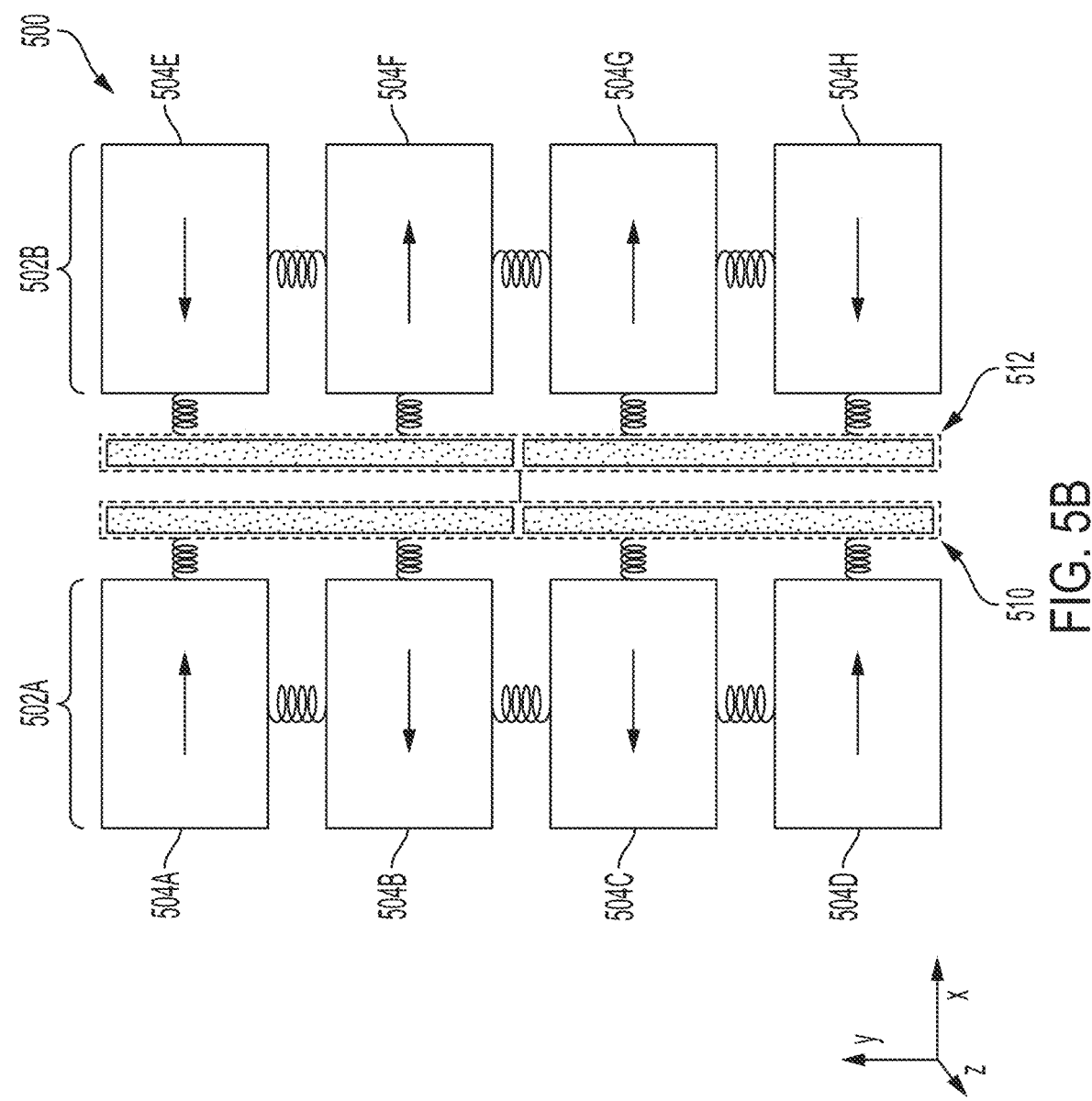
FIG. 5B illustrates the relative motion of proof masses of the example MEMS device of FIG. 5A, according to some non-limiting embodiments.

FIG. 5B illustrates the relative motion of proof masses of the example MEMS device of FIG. 5A, according to some non-limiting embodiments. In the illustrated embodiment, the first column 502A is configured for sensing roll rotation (i.e. rotation about the y-axis in this example), and therefore proof masses 504A-504D may be driven in the x-direction and the MEMS device 500 may be configured to sense motion of the proof masses 504A-504D out-of-plane along the z-axis caused by roll rotation. The second column 502B may be configured for sensing yaw rotation (i.e., rotation about the z-axis), and therefore proof masses 504E-504H may be driven in the x-direction and the MEMS device 500 may be configured to sense motion of the proof masses 504E-504H along the y-axis caused by yaw rotation.

As described herein, the inventors have recognized that the concepts of linear and rotational balancing described herein with respect to MEMS device 100, for example, may be extended to gyroscopes having four proof masses per column. For example, to achieve rotational balancing, each column of the MEMS device 500 may be configured with outer masses moving in opposite directions relative to the motion of inner masses. In particular, outer proof masses 504A, 504D of the first column 502A may be configured to move in a direction along the x-axis opposite the direction of motion of inner proof masses 504B, 504C—for example, outer masses 504A, 504D move right when inner masses 504B, 504C move left. Likewise, outer proof masses 504E, 504H may be configured to move in a direction along the x-axis opposite the direction of motion of inner proof masses 504F, 504G—for example, outer masses 504E, 504H may be configured to move to the left when inner proof masses 504F, 504G move to the right.

The inventors have recognized that, in some embodiments, it may be advantageous to provide for rigid coupling between inner masses of each column, for example between inner masses 504B, 504C of the first column 502A and/or between inner masses 504F, 504G of the second column 502B. Rigid coupling between inner masses of each column is possible given that the motion of inner proof masses are in the same direction along a common axis, and doing so may account for stress of the MEMS device. However, in some embodiments, coupling between inner masses of a column may be flexible, and, in other embodiments, there may be no coupling between adjacent proof masses of each column. The inventors have further appreciated that configuring the drive arrays of the MEMS device alongside the columns of proof masses allows for any form of coupling between inner proof masses, as opposed to configurations of the MEMS device where drive arrays are disposed between the proof masses of a respective column (e.g., between inner proof masses).

Linear balancing of the MEMS device 500 may be achieved by balancing the mass moving in opposite directions along a common axis—i.e., balancing the mass of the outer masses of each column, with the mass of the inner masses of each column, respectively, as described herein. For example, in the illustrated embodiment, each of the first and second columns 502A, 502B have four proof masses—two outer masses and two inner masses moving in opposite directions along a common axis—and thus balancing the masses of the proof masses in each column may be achieved by configuring each proof mass with an equal mass.

Figure 5C:
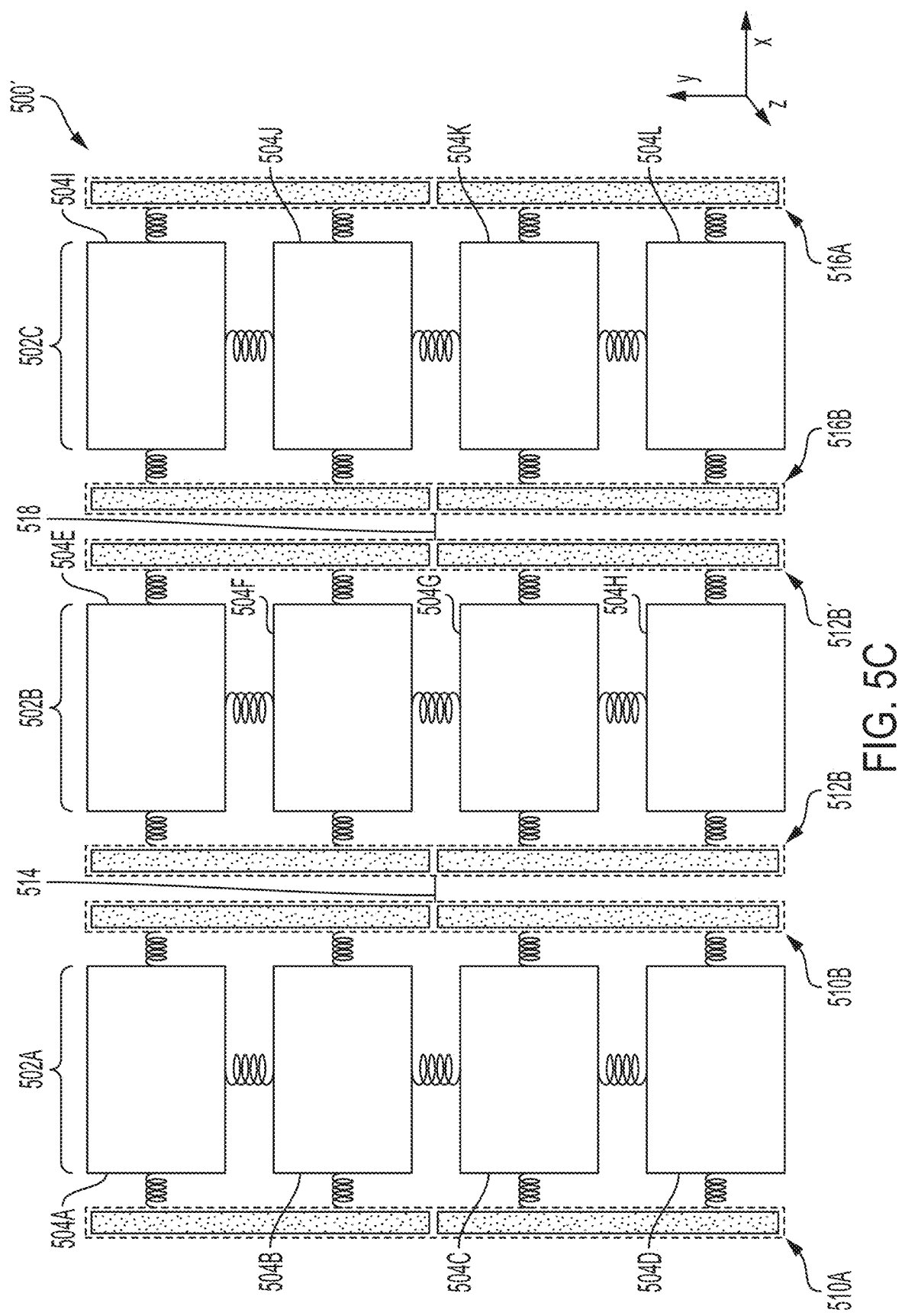
FIG. 5C illustrates the example MEMS device of FIG. 5A having a third multiple-mass column for sensing rotation about an additional axis, according to some non-limiting embodiments.

FIG. 5C illustrates the example MEMS device of FIG. 5A having a third multiple-mass column for sensing rotation about an additional axis, according to some non-limiting embodiments. As shown in FIG. 5C, first, second, and third columns 502A, 502B, 502C of MEMS device 500' each have four proof masses per column, and each of the columns 502A, 502B, 502C comprise a pair of drive arrays. As such, the MEMS device 500' may be considered in much the same manner as MEMS device 400 described with respect to FIGS. 4A-4B and other MEMS devices described herein, except that each of the first, second, and third columns 502A, 502B, 502C comprise four proof masses.

Figure 5D:
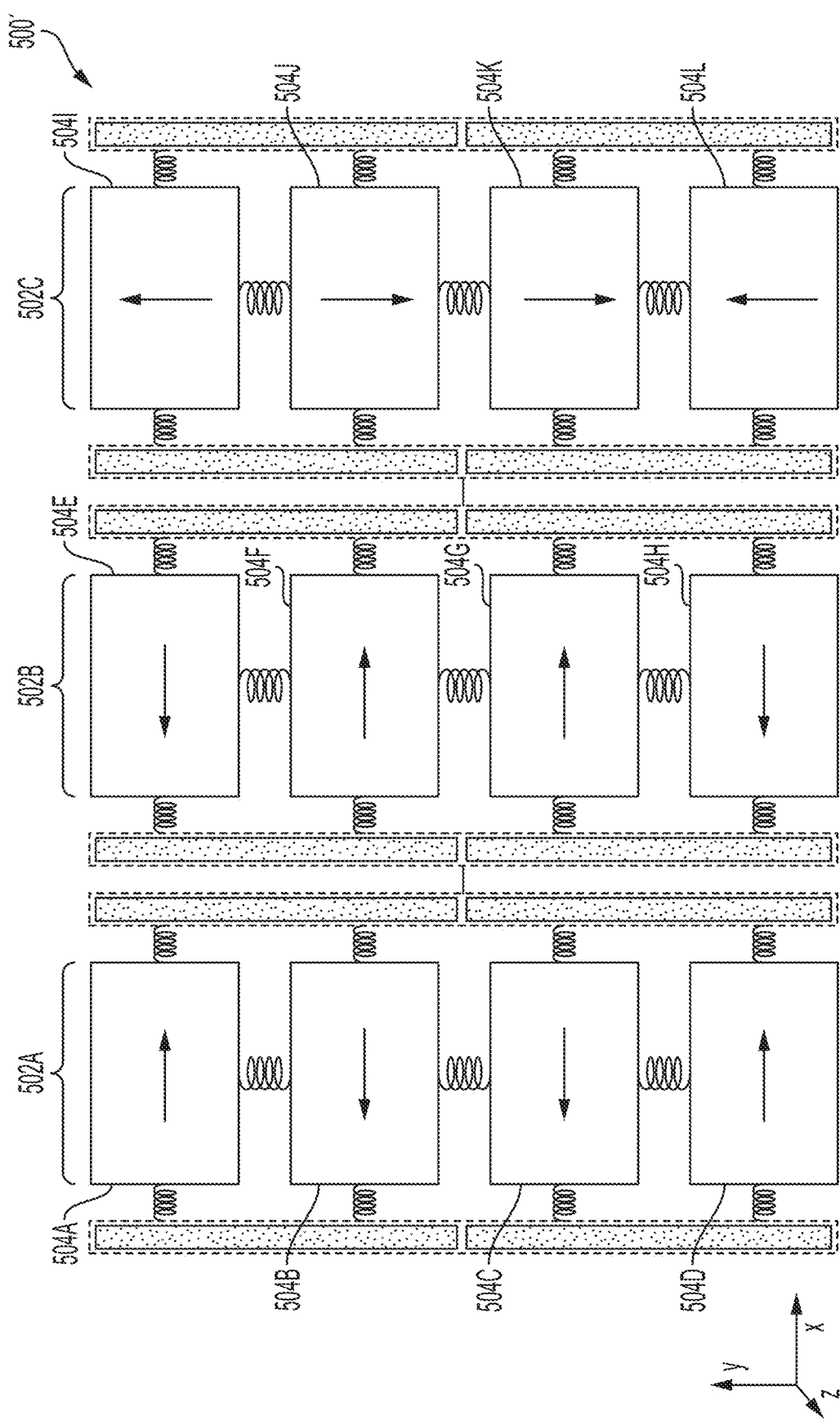
FIG. 5D illustrates the relative motion of proof masses of the example MEMS device of FIG. 5C, according to some non-limiting embodiments.

FIG. 5D illustrates the relative motion of proof masses of the example MEMS device of FIG. 5C, according to some non-limiting embodiments. As described herein, the first column 502A is configured for sensing roll rotation (i.e. rotation about the y-axis in this example), and therefore proof masses 504A-504D may be driven in the x-direction and the MEMS device 500' may be configured to sense motion of the proof masses 504A-504D out-of-plane along the z-axis caused by roll rotation. The second column 502B may be configured for sensing yaw rotation (i.e., rotation about the z-axis in this example), and therefore proof masses 504E-504H may be driven in the x-direction and the MEMS device 500' may be configured to sense motion of the proof masses 504E-504H along the y-axis caused by yaw rotation. The third column 502C may be configured for sensing pitch rotation (i.e., rotation about the x-axis in this example), and therefore proof masses 504I-504L may be driven in the y-direction and the MEMS device 500' may be configured to sense motion of the proof masses 504I-504L out-of-plane along the z-axis caused by pitch rotation.

As should be appreciated from the foregoing, for example, FIGS. 4A-5D and the accompanying descriptions, the MEMS device 500' may be configured such that the MEMS device 500' is rotationally and linearly balanced. For example, to achieve rotational balancing, each column of the MEMS device 500' may be configured with outer masses moving in opposite directions relative to the motion of inner masses. In particular, outer proof masses 504A, 504D of the first column 502A may be configured to move in a direction along the x-axis opposite the direction of motion of inner proof masses 504B, 504C—for example, outer masses 504A, 504D move right when inner masses 504B, 504C move left. Likewise, outer proof masses 504E, 504H may be configured to move in a direction along the x-axis opposite the direction of motion of inner proof masses 504F, 504G—for example, outer masses 504E, 504H may be configured to move to the left when inner proof masses 504F, 504G move to the right. For the third column 502C, outer masses 504I, 504L may be configured to move in a direction along the y-axis opposite the direction of motion of inner proof masses 504J, 504K—for example, outer masses 504F, 504G move up when inner proof masses 504F, 504K move down. Likewise, linear balancing may be achieved by balancing the mass of the outer masses of each column, with the mass of the inner masses of each column, for example by configuring each proof mass with an equal mass to balance the total mass, in each column, moving in each direction along a common axis.

Having thus described various examples of MEMS devices herein, aspects of certain components of the example MEMS devices will now be described further. For example, FIG. 6A is a top view illustrating schematically an example MEMS device having in-line springs, according to some non-limiting embodiments. In particular, FIG. 6A illustrates a portion of a MEMS device, for example, MEMS device 100 shown in FIG. 1. It should be appreciated that FIG. 6A is only a partial view of MEMS device 100, and thus, not every component of MEMS device 100 is shown in FIG. 6A. For example, drive arrays 110, 112 are omitted from FIG. 6A for simplicity of illustration. Further aspects of the drive arrays 110, 112 will be described herein, for example, with respect to FIGS. 7A-7C.

FIG. 6A illustrates aspects of the coupling between proof masses 104A and 104B. Although FIG. 6A is described herein with respect to proof masses 104A and 104B, other proof masses of the MEMS device may be configured in the same manner as illustrated herein. As shown in FIG. 6A, the MEMS device 100 includes proof masses 104A, 104B, in-line springs 120 and 121, paddle 122, levers 124, and anchors 128. Anchors 128 may be fixed to an underlying substrate, as described herein. In-line springs 121 may couple anchors 128 to levers 124 and in-line springs 120 may couple levers 124 to a respective proof mass 104A, 104B. In-line springs may be oriented substantially along (e.g., within less than 5°) the drive direction (which, in the illustrated embodiment, is the x-axis direction) and are compliant along the direction substantially perpendicular to (e.g., within less than 5° of the direction normal to) the drive direction (which, in the illustrated embodiment, is the y-axis direction). It should be appreciated that the in-line springs of FIG. 6A are depicted with symbols intended to show the direction of compliance (the y-axis direction) rather than the physical orientation. As will be described further below, the in-line springs 120, 121 may be physically implemented with beams oriented substantially along the drive direction.

As illustrated in FIG. 6A, only in-line springs 120, 121 may be connected to the proof masses 104A, 104B. That is, no other types of springs (e.g., no springs compliant in directions other than substantially perpendicular to the drive motion) are used for enabling the driving of the proof masses. The inventors have recognized that using only springs compliant in the direction perpendicular to the drive motion (e.g., the y-axis for proof masses 104A, 104B) may limit quadrature motion caused, for example, by slanted sidewalls in the springs. As shown in FIG. 6A, proof masses 104A, 104B may have a generally rectangular (e.g., a square) shape. Paddle 122 along with in-line springs 108 may connect proof mass 104A to proof mass 104B and may be compliant in the y-axis direction.

As described herein, proof masses 104A, 104B may lie substantially in a plane. For example, proof masses 104A, 104B may each have a pair of opposing surfaces (spaced from each other in the z-axis direction) that are parallel to each other or angled relative to each other by less than 5°.

In some embodiments, MEMS device 100 may also include orthogonal springs (springs oriented perpendicular to the drive motion). However, such orthogonal springs may not be directly connected to the proof masses and/or may not contribute to the drive motion stiffness. In this way, even if orthogonal springs are used, quadrature motion is nonetheless rejected.

FIG. 6B is a top view of the gyroscope of FIG. 6A with proof masses 104A and 104B oscillating along the x-axis in opposite directions, according to some non-limiting embodiments. As shown in FIG. 6B, motion of the proof masses is enabled by the in-line springs 120 and 121 and the levers 124. Specifically, in-line springs 120 and 121, by extending and compressing along the y-axis direction, allow the levers 124 to pivot. As a result, the proof masses may move relative to the position of the anchors 128. An example illustrating a physical implementation of the levers and the in-line springs is illustrated further below. Levers may be referred to herein as "intermediate masses," because they may serve as intermediate structures between the proof masses and the substrate. As described herein, in some embodiments, the proof masses are coupled to the intermediate masses (e.g., levers 124) only by springs oriented substantially in the drive direction (e.g., in-line springs 120, 121). Intermediate masses other than levers 124 shown in FIGS. 6A-6B may be used to couple the proof masses to the substrate while facilitating motion of the proof masses in the drive direction. Such intermediate masses may be flexible and/or bendable.

Paddle 122 connecting proof mass 104A with proof mass 104B, may be arranged to maintain anti-phase relationship (i.e. motion in substantially opposite directions along an axis) between the proof masses. Although the illustrated embodiment in FIG. 6B illustrates proof masses 104A and 104B moving in opposite directions, in some embodiments, adjacent proof masses may be configured to move in substantially the same direction (for example, proof masses 504B and 504C illustrated in FIG. 5C). In such embodiments, paddle 122 may be configured differently than a paddle coupling adjacent proof masses moving in opposite directions. For example, paddle 122 may provide rigid coupling between adjacent proof masses moving in substantially the same direction to facilitate movement of the adjacent proof masses together, and paddle 122 may comprise a rigid beam. In other embodiments, adjacent proof masses moving in substantially the same direction may be flexibly coupled with paddle 122, or in other embodiments, may not comprise any coupling at all between the two proof masses.

Figure 6D:
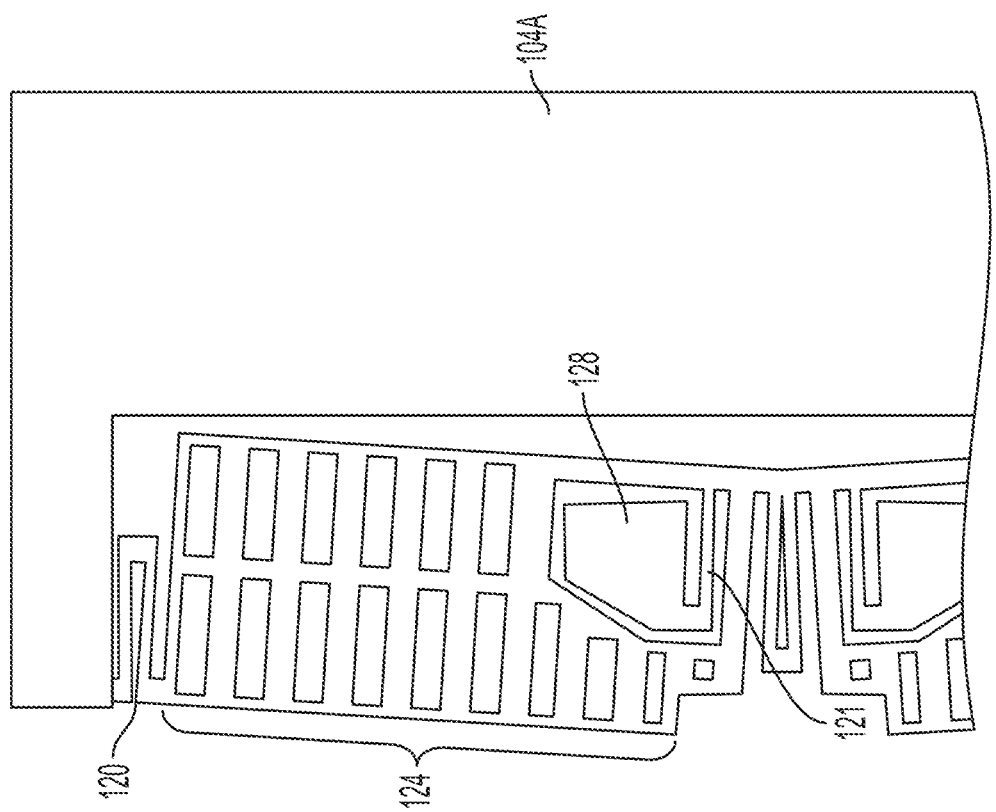
FIG. 6D is a top view illustrating schematically the MEMS device portion of FIG. 6C when driven in the x-axis direction, according to some non-limiting embodiments.
Figure 6C:
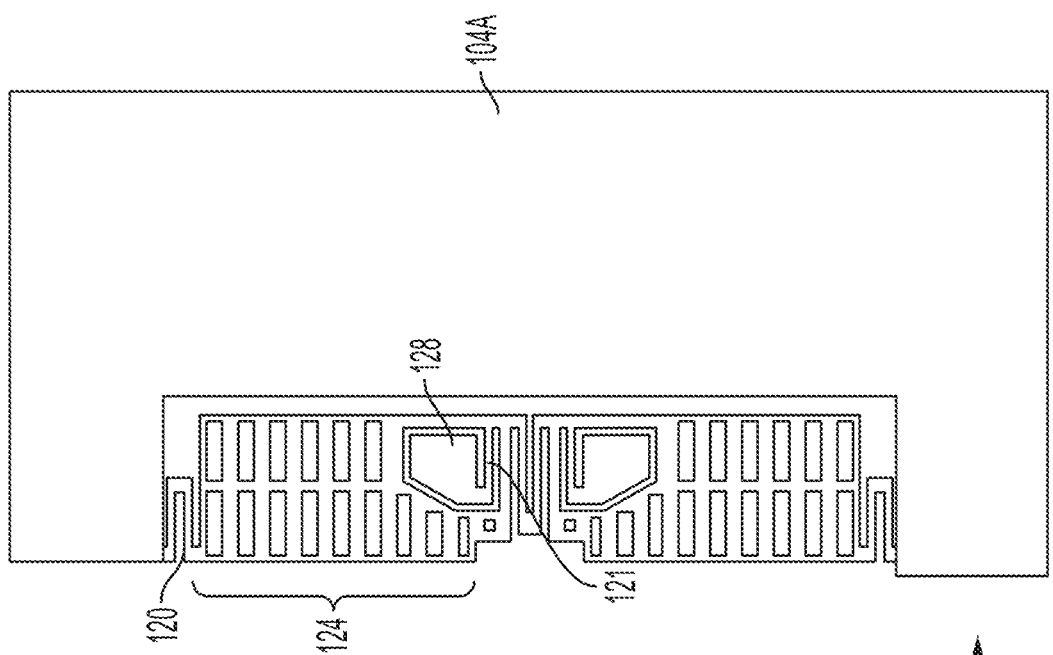
FIG. 6C is a top view illustrating portion "A" of the MEMS device of FIG. 6A, according to some non-limiting embodiments.

FIG. 6C illustrates in additional detail a physical implementation of the region labeled "A" in FIG. 6A, according to some non-limiting embodiments. In the illustrated example, in-line springs 120 are oriented substantially along the drive direction (the x-axis direction). Specifically, in this case, in-line spring 120 includes beams oriented substantially along the drive direction. In some embodiments, in-line springs 120 may be compliant (e.g., may be able to compress and extend) in a direction substantially perpendicular to the drive direction (e.g., the y-axis). It should be appreciated that in-line spring 120 may also include beams connecting the beams oriented in the x-axis direction that are not oriented in the x-axis direction. However, these beams may be shorter than the beams oriented in the x-axis direction, thus maintaining the in-line spring's compliance along the y-axis.

Lever 124 may include a mass coupled between in-line spring 120 and anchor 128. In the illustrated embodiment, levers 124 are shown as having multiple holes formed therethrough, the holes being used for releasing the underlying sacrificial layer during fabrication. Lever 124 may be coupled to anchor 128 via in-line spring 121. Similar to in-line spring 120, in-line spring 121 may be oriented substantially along the drive direction (e.g., the x-axis) and may be compliant in a direction substantially perpendicular to the drive direction (e.g., the y-axis). For example, in-line spring 121 may include beams oriented in the drive direction that are longer than the beams oriented in other directions (e.g., in the direction perpendicular to the drive direction).

Motion of proof mass 104A in the drive direction may be enabled by motion of the levers 124. Motion of the levers 124 may in turn be enabled or facilitated by compliance of the in-line springs in the y-axis direction. FIG. 6D illustrates the MEMS device portion of FIG. 6C when displaced in the x-axis direction, according to some non-limiting embodiments. In the illustrated embodiment in FIG. 6D, proof mass 104A is displaced, relative to its position at rest, due to a movement to the right along the x-axis. As shown, motion of the proof mass is enabled or facilitated by compliance of the in-line springs 120, 121 in the direction perpendicular to the drive direction (e.g., the y-axis). The compliance of the in-line springs allows a rotation of the levers 124 in the xy-plane, allowing the proof mass 104 to move freely along the x-axis in the drive direction.

In some embodiments, implementations of the in-line springs 120, 121 and levers 124 other than those illustrated in and described with respect to FIG. 6C may be used. In addition, in some embodiments, other proof masses and/or columns of the MEMS devices described herein may be configured in the same or similar manner as proof masses 104A and 104B, with modifications made to account for differences in drive and sense directions between the different columns.

Figure 7A:
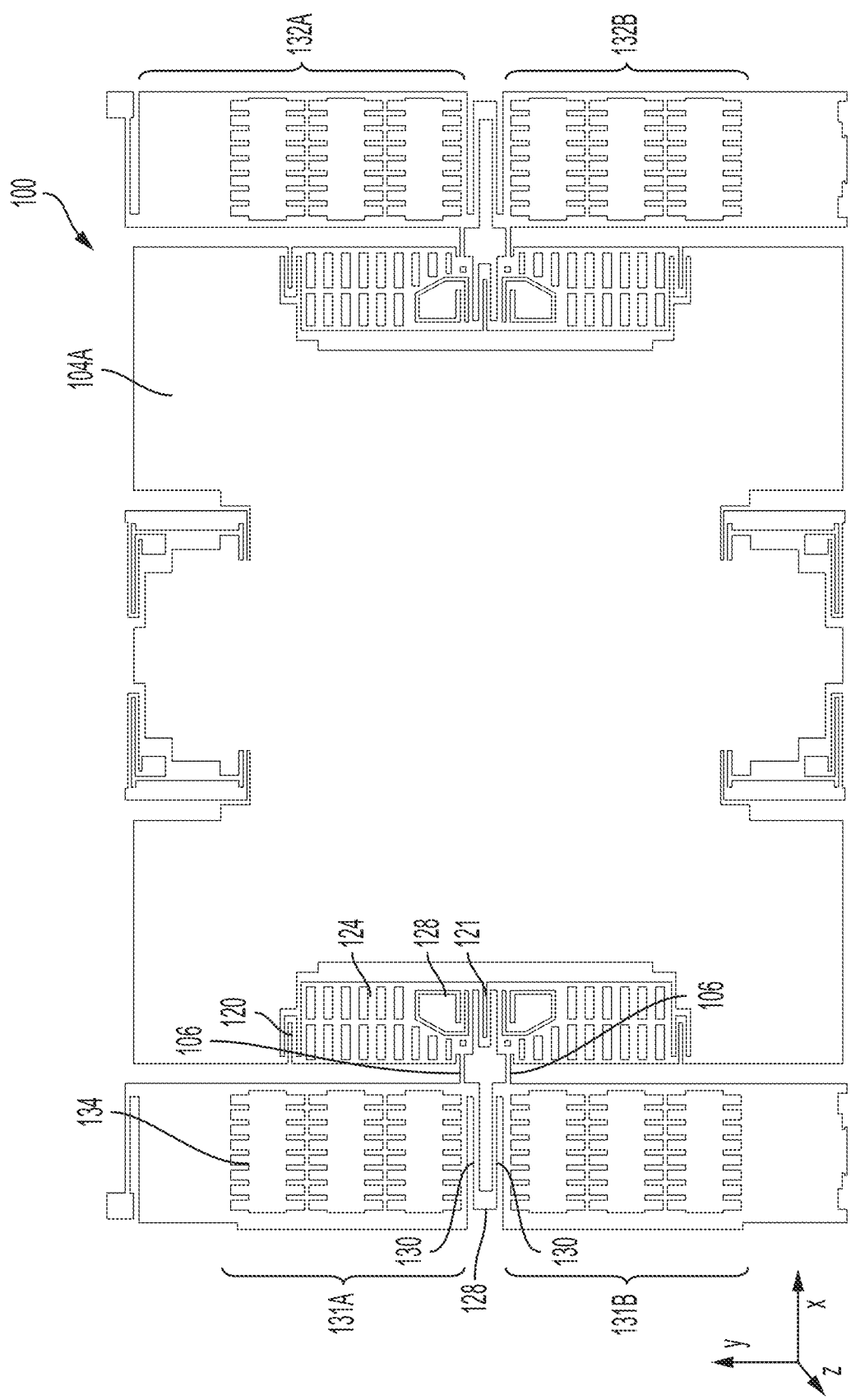
FIG. 7A illustrates aspects of a portion of a drive array of a first column of the example MEMS device of FIG. 1, according to some non-limiting embodiments.

As described herein, proof masses of the example MEMS devices may be caused to move in a drive direction by one or more drive mechanisms (e.g., drive arrays). FIG. 7A illustrates aspects of a portion of an example drive array of the MEMS device of FIG. 1, according to some non-limiting embodiments. For example, FIG. 7A illustrates a portion of the MEMS device 100 having proof mass 104A, outer drive array 110A, and inner drive array 110B. Proof mass 104A may be configured as previously described herein, for example, with respect to FIGS. 6A-6D. For example, proof mass 104A may be coupled to levers 124 via in-line springs 120, and levers 124 may be coupled to anchors 128 via in-line springs 121.

As shown in FIG. 7A, the proof mass 104A may comprise outer and inner drive arrays 110A, 110B disposed alongside the proof mass 104A on opposite sides of the proof mass 104A. As described herein, the inventors have recognized that configuring the drive arrays alongside each column of proof masses allows for stronger coupling and more direct driving of the proof masses. Strong coupling between the proof masses and drive arrays helps to ensure that the motion of adjacent columns have a fixed drive motion ratio.

The drive arrays may comprise a plurality of drive modules, as described herein. In the illustrated embodiment, each drive array 110A, 110B is shown having two drive modules disposed alongside each proof mass. That is, proof mass 104A comprises four drive modules disposed alongside the proof mass 104A—drive modules 131A, 131B of the outer drive array 110A on a left side of the proof mass 104A, and drive modules 132A, 132B of the inner drive array 110B on a right side of the proof mass 104A. In some embodiments, the drive arrays are configured such that more than two drive modules are disposed along (and, in some embodiments, coupled to) a side of a proof mass (e.g., three drive modules per side, four modules per side, etc.). The inventors have recognized that configuring each drive array with at least two drive modules is advantageous as it allows for achieving net-zero momentum of the drive arrays. In particular, each of the drive modules may be configured to move along a same axis (which, in the illustrated embodiment, is the y-axis), regardless of what direction the proof masses to which the drive modules are coupled to are driven. Configuration of tethers coupling the proof masses to respective drive modules allows for the proof masses to be driven in a desired drive direction despite the motion of all the drive modules of the MEMS device being along a fixed axis. An equal number of drive modules of a particular drive array may be configured to move in opposite directions along the y-axis to achieve net-zero momentum of the drive arrays. Thus, in some embodiments, each drive array may comprise an even number of drive modules.

As shown in FIG. 7A, drive modules 131A, 131B, 132A, 132B are coupled to anchors 128 via in-line springs 130. As described herein, anchors may be coupled to the underlying substrate. In-line springs 130 may be configured in the same manner as in-line springs 120, 121. For example, in-line springs 130 may include beams oriented substantially along the x-axis and may be compliant (e.g., may be able to compress and extend) along the y-axis. Thus, in-line springs 130 may facilitate movement of drive modules 131A, 131B, 132A, 132B relative to anchors 128 along the y-axis.

In some embodiments, drive modules include drive capacitors, in which electrostatic forces are used to cause motion of the proof masses. For example, drive modules may comprise a first plurality of electrodes (e.g., electrodes 134) being spaced a distance from a second plurality of electrodes which are coupled to the underlying substrate. A voltage may be applied to the second plurality of electrodes causing the distance between the first and second plurality of electrodes to decrease. The drive modules may therefore move up and down along the y-axis by virtue of the decreased distance between the first and second plurality of electrodes, further facilitated by in-line springs 130.

As shown in FIG. 7A, drive modules may be coupled to proof mass 104A by a tether 106 (also referred to herein as a spring). Tether 106 may be configured to facilitate driving of the proof mass 104A in the drive direction when drive modules move up and down along the y-axis. As described herein, drive modules may be configured to move up and down along the y-axis, while the drive direction of the proof masses may or may not also be along the y-axis. The inventors have recognized that configuring the MEMS device 100 such that all of the drive modules of the MEMS device move along a same axis, irrespective of the direction in which the proof masses move in, allows for a MEMS device having a more compact design and stronger coupling between components. In the illustrated embodiment, the drive direction is along the x-axis. Thus, tethers 106 are configured such that the proof mass 104A moves along the x-axis when drive modules 131A, 131B, 132A, 132B move up and down along the y-axis.

The motion of the proof masses may thus be controlled based on the voltage applied to the second plurality of electrodes coupled to the underlying substrate. The motion of the drive modules along the y-axis may be proportional to the motion of the proof masses along the drive direction (e.g., in the illustrated embodiment, along the x-axis). For example, in some embodiments, the motion of the proof masses may be approximately 2.5 times greater than the motion of the drive modules. In some embodiments, the motion of the proof masses may be approximately 3.5 times greater than the motion of the drive modules.

Figure 7B:
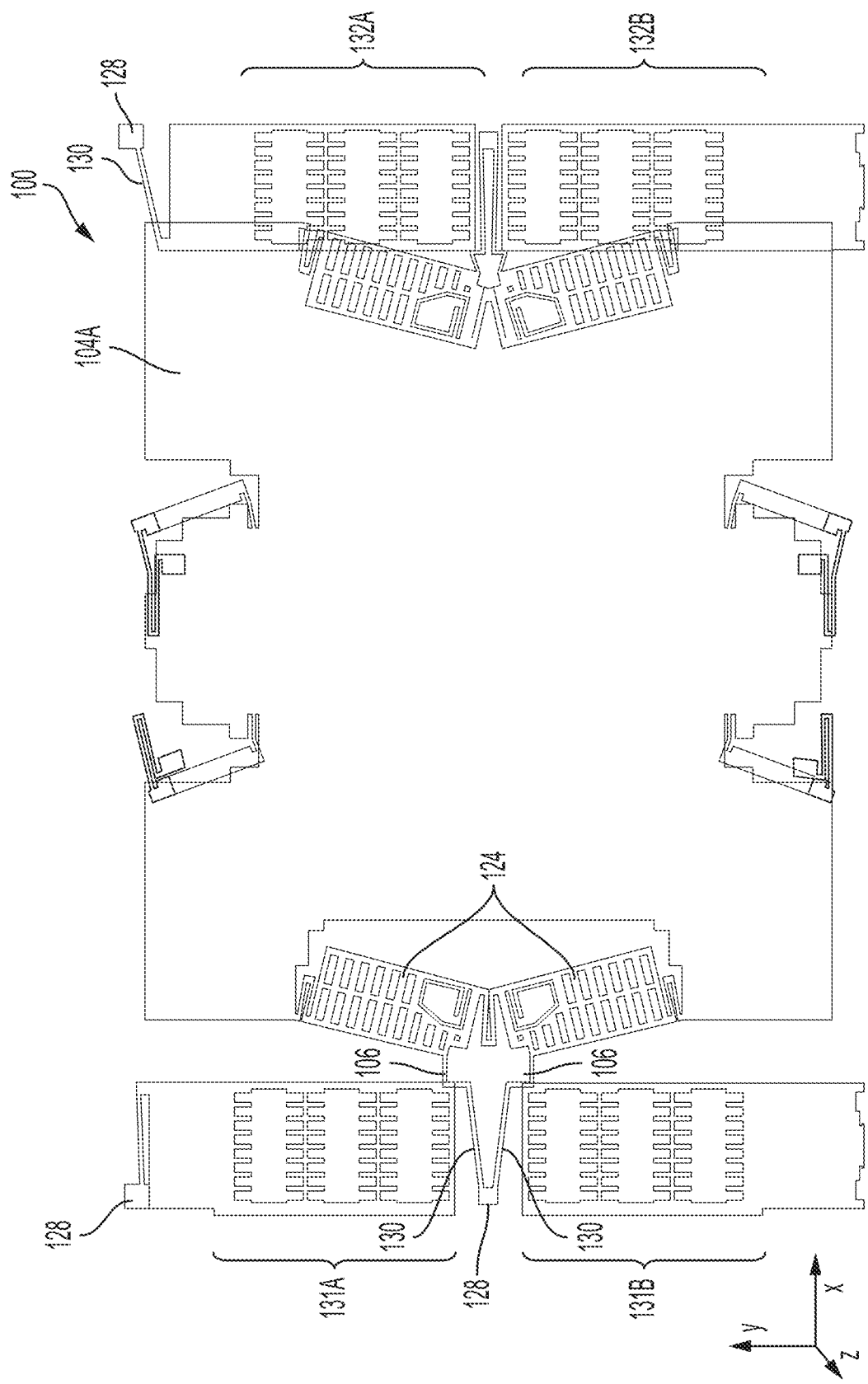
FIG. 7B is a top view illustrating schematically the MEMS device portion of FIG. 7A when driven in the x-axis direction, according to some non-limiting embodiments.

FIG. 7B is a top view illustrating schematically the MEMS device portion of FIG. 7A when displaced in the x-axis direction, according to some non-limiting embodiments. As shown in FIG. 7B, the proof mass 104A is driven along the x-axis, and, in particular, proof mass 104A is illustrated moving to the right along the x-axis in the illustrated embodiment. At the same time, drive modules 131A, 131B, 132A, and 132B are shown moving along the y-axis. In particular, drive modules 131A and 131B move apart with drive module 131A moving up while drive module 131B moves down, and drive modules 132A and 132B move together with drive module 132A moving down while drive module 132B moves up. As shown in FIG. 7B and further illustrated in the following figures herein, a proof mass may move along the x-axis away from drive modules moving apart, and towards drive modules moving together, due to the coupling between the proof masses and the drive modules via tethers 106. The motion of the proof masses may thus be controlled at least in part by electronic components of the underlying substrate, as the relative motion of the drive modules may be controlled by virtue of the voltage applied to the plurality of electrodes coupled to the substrate.

Figure 7C:
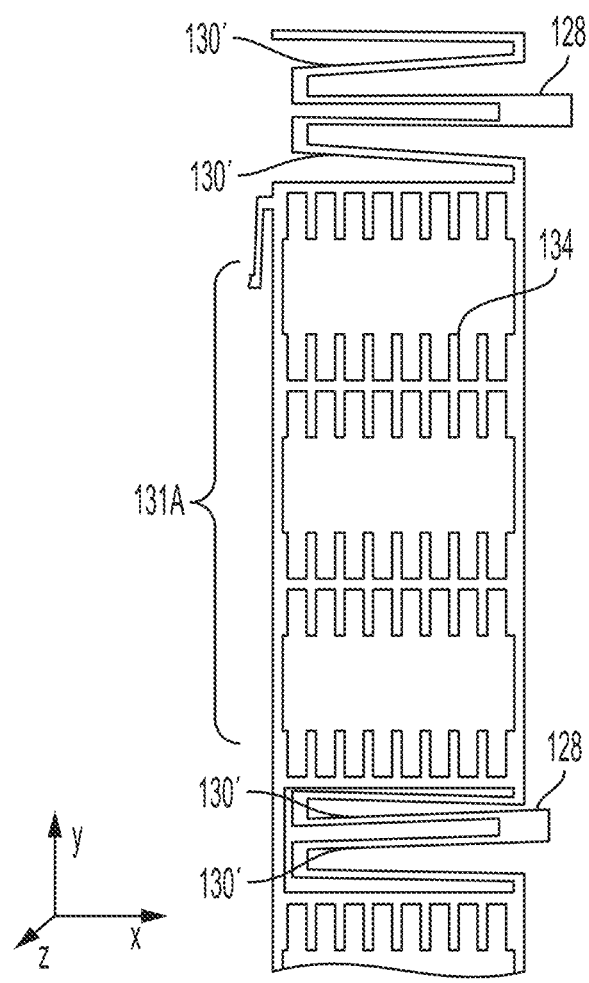
FIG. 7C is a top view illustrating schematically a drive array of the MEMS device of FIG. 1, according to some non-limiting embodiments.

FIG. 7C is a top view illustrating schematically a drive array of the MEMS device of FIG. 1, according to some non-limiting embodiments. In particular, FIG. 7C illustrates an alternative configuration of in-line springs 130. For example, drive arrays of the MEMS device illustrated in FIG. 7C comprise double-folded springs 130' between adjacent drive modules. Similar to the embodiment illustrated in FIGS. 7A-7B, drive module 131A may be coupled to anchors 128. However, in the embodiment illustrated in FIG. 7C, drive modules are coupled to anchors 128 using double folded springs 130'. The inventors have recognized that implementing double-folded springs 130' may reduce drive array stiffness.

Having thus described aspects of the technology relating to individual drive modules, it should be appreciated that one or more other drive modules of the example MEMS devices described herein may be configured in the same or similar manner as drive modules 131A, 132B, 132A, and 132B. According to an aspect of the technology described herein, the drive modules are manufactured being modular—in other words, each of the drive modules are interchangeable, allowing for simpler design and manufacture of the MEMS device.

Figure 8:
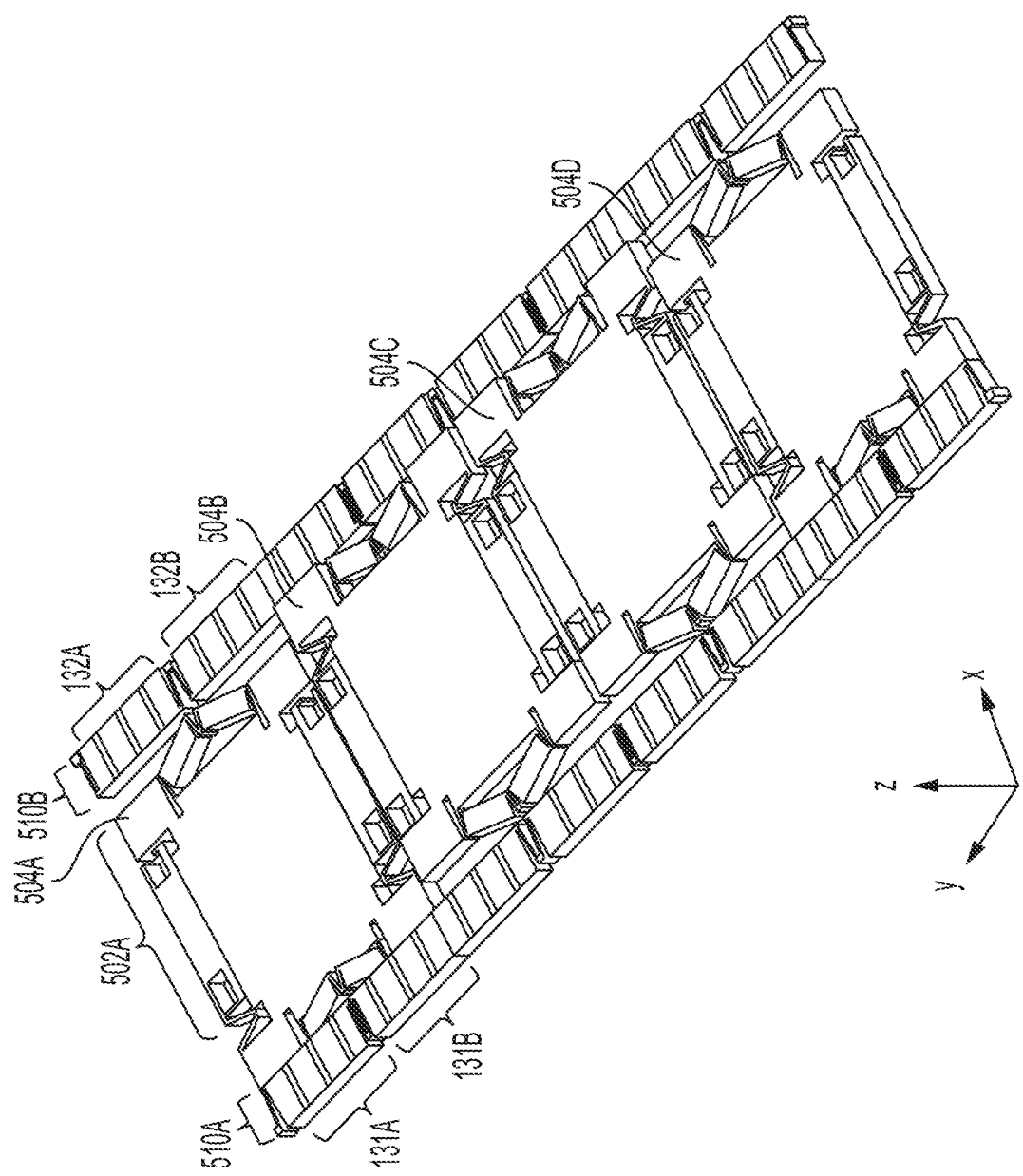
FIG. 8 illustrates aspects of a multiple-mass column of the example MEMS device of FIG. 5A, according to some non-limiting embodiments.

FIG. 8 illustrates aspects of a multiple-mass column of the example MEMS device of FIG. 5C, according to some non-limiting embodiments. FIG. 8 illustrates a portion of the MEMS device 500, in particular, a single column 502A of the multi-column MEMS device. It should be understood that, in some embodiments, the MEMS device 500 comprises at least two multiple-mass columns with each column being configured in a similar manner to the column 502A shown in FIG. 8. Further details of the coupling between the multiple-mass columns of the MEMS devices are described herein.

In the embodiment illustrated in FIG. 8, the column 502A comprises four proof masses 504A-504D. Each proof mass of the column 502A is coupled to a drive array 510A, 510B on a respective lateral side of the proof mass. For example, proof masses 504A-504D are coupled to drive array 510A on a left side of the proof masses, and to drive array 510B on a right side of the proof masses.

In particular, each proof mass is coupled to at least two drive modules of each drive array. As shown in FIG. 8, proof mass 504A is coupled to drive modules 131A and 131B of drive array 510A on a left side of the proof mass, and to drive modules 132A and 132B of drive array 510B on a right side of proof mass 504A. As described herein, the inventors have recognized that configuring the drive arrays alongside each column of proof masses allows for stronger coupling between components of the MEMS device (e.g., between the drive arrays and the proof masses) and more direct driving of the proof masses which may prevent or reduce drive misalignment and quadrature. The inventors have further recognized that coupling each proof mass to at least two drive modules per drive array may achieve net-zero momentum of the drive arrays, as described herein.

As shown in FIG. 8, the four proof masses 504A-504D may be disposed linearly along column 502A without being interrupted by a drive structure (such as a drive array) disposed between adjacent proof masses of a particular column. As such, adjacent proof masses of a column may be advantageously coupled together, as described herein. For example, to facilitate linear and rotational balancing of the MEMS device 500, the inner proof masses 504B, 504C may be displaced in a direction opposite the direction in which the outer proof masses 504A, 504D are displaced. As there are no drive structures interrupting the coupling between the proof masses 504A-504D, the inner proof masses 504B, 504C which are displaced in a same direction may be rigidly coupled together in some embodiments, and the outer proof masses 504A, 504D may be coupled to inner proof masses 504B, 504C, respectively, in a flexible manner to facilitate antiphase motion of adjacent inner and outer proof masses. In other embodiments, there may be no coupling between inner and outer proof masses.

Figure 9A:
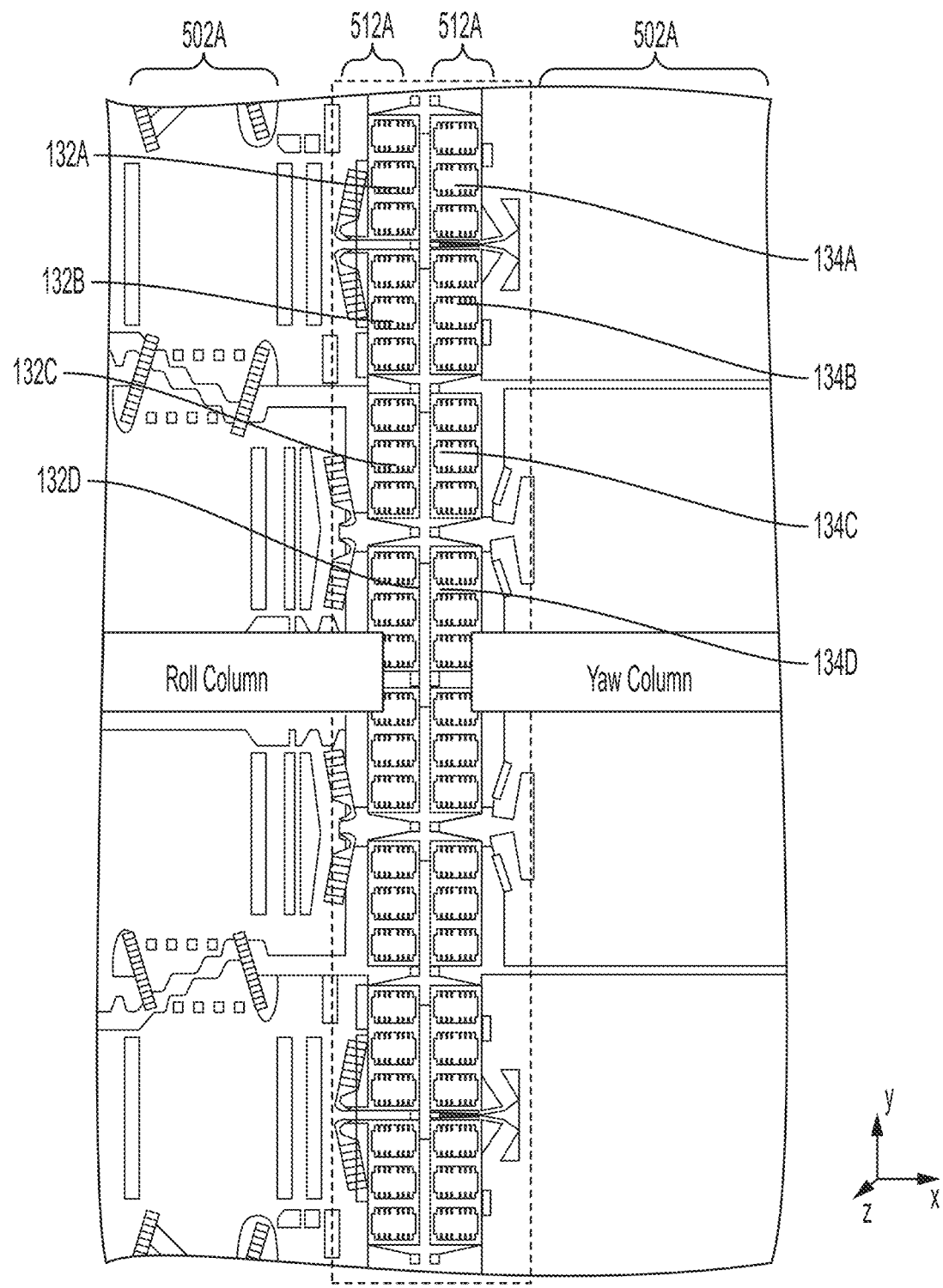
FIG. 9A illustrates aspects of the drive arrays of the example MEMS device of FIG. 5C, according to some non-limiting embodiments.

FIG. 9A illustrates aspects of the drive arrays of the example MEMS device of FIG. 5C, according to some non-limiting embodiments. In particular, FIG. 9A illustrates an enlarged view of drive arrays 510B and 512B which are coupled to column 502A and 502B, respectively. As described herein, the proof masses of column 502A may be configured to sense roll rotation which may be facilitated by displacement of the proof masses in the x-direction. The proof masses of column 502B may be configured to sense yaw rotation which may also be facilitated by displacement of the proof masses in the x-direction. In the illustrated embodiment, the proof masses of columns 502A and 502B are displaced along a same axis. However, in some embodiments, one or more proof masses of the MEMS device may be displaced along a different axis (e.g., along the y-axis). For example, although not shown in FIG. 9A, the proof masses of column 502C may be configured to sense pitch rotation which may be facilitated by displacement of the proof masses in the y-direction. Although the proof masses of each column may be displaced in different directions, each of the drive arrays and their respective drive modules (e.g., drive modules 132A-132D, 134A-134D shown in FIG. 9A) are configured to move along a same axis (such as the y-axis, as in the illustrated embodiments described herein).

Movement of the drive modules along the y-axis (e.g., up or down) as well as the configuration of the tethers described herein may facilitate motion of the proof masses along a particular direction. As described herein, for motion of the proof masses along the x-axis, a pair of drive modules moving away from each other may cause movement of the proof mass away from the drive array and a pair of drive modules moving toward each other may cause movement of the proof mass towards the drive array.

Referring back to FIG. 5D, the relative motion of proof masses 504A-504H is shown. FIG. 5D illustrates that laterally adjacent proof masses of columns 502A and 502B (e.g., proof masses 504A and 504E, 504B and 504F, 504C and 504G, and 504D and 504H) move in opposite directions. Thus, from the perspective of inner drive arrays 510B and 512B, both pairs of laterally adjacent proof masses 504A and 504E, and 504D and 504H move towards inner drive arrays 510B and 512B while pairs of laterally adjacent proof masses 504B and 504F, and 504C and 504G move away from inner drive arrays 510B and 512B. To achieve such motion, drive modules 132A and 132B, and 134A and 134B, respectively, move towards each other such that proof masses 504A and 504E move towards inner drive arrays 510B and 512B, while drive modules 132C and 132D, and 134C and 134D, respectively, move away from each other such that proof masses 504B and 504F move away from inner drive arrays 510B and 512B.

Thus, as shown in FIG. 9A, adjacent pairs of drive modules (132A and 134A, 132B and 134B, 132C and 134C, and 132D and 134D) move along the y-axis in a same direction at substantially the same amplitude and frequency. In other words, each of the laterally adjacent drive modules of drive arrays 510A and 510B move together in-phase. As a result, laterally adjacent drive modules may be rigidly coupled together. Rigid coupling between laterally adjacent drive modules moving in-phase provides for stronger drive-mode coupling.

Although motion of the proof masses in relation to motion of the drive modules has been described herein according to the illustrated embodiments, it should be appreciated that other configurations of the MEMS device are possible. For example, in some embodiments, the drive modules, proof masses, tethers, and/or one or more components may be configured differently such that proof masses move towards a drive array when respective drive modules move away from each other, for example.

Figure 9B:
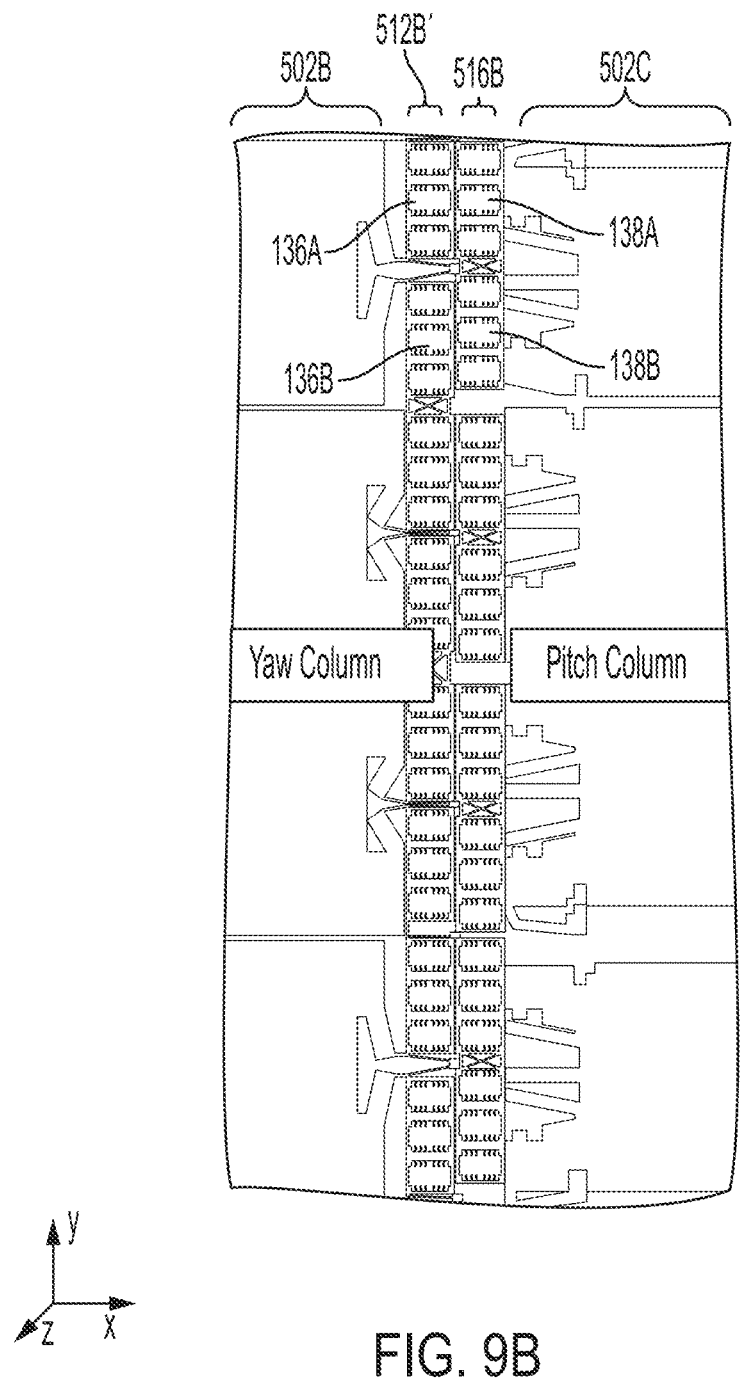
FIG. 9B illustrates further aspects of the drive arrays of the example MEMS device of FIG. 5C, according to some non-limiting embodiments.

FIG. 9B illustrates further aspects of the drive modules of FIG. 5C, according to some non-limiting embodiments. In particular, FIG. 9B illustrates an enlarged view of drive arrays 512B' and 516B which are coupled to columns 502B and 502C, respectively. As described herein, the proof masses of column 502B may be configured to sense yaw rotation which may be facilitated by displacement of the proof masses along the x-axis. The proof masses of column 502C may be configured to sense pitch rotation which may be facilitated by displacement of the proof masses along the y-axis. In the illustrated embodiment, the proof masses of columns 502B and 502C are displaced along different axes (the x-axis and the y-axis), however, each of the drive arrays 512B' and 516B and their respective drive modules are configured move along the same axis (the y-axis, in the illustrated embodiment), as described herein.

Figure 9C:
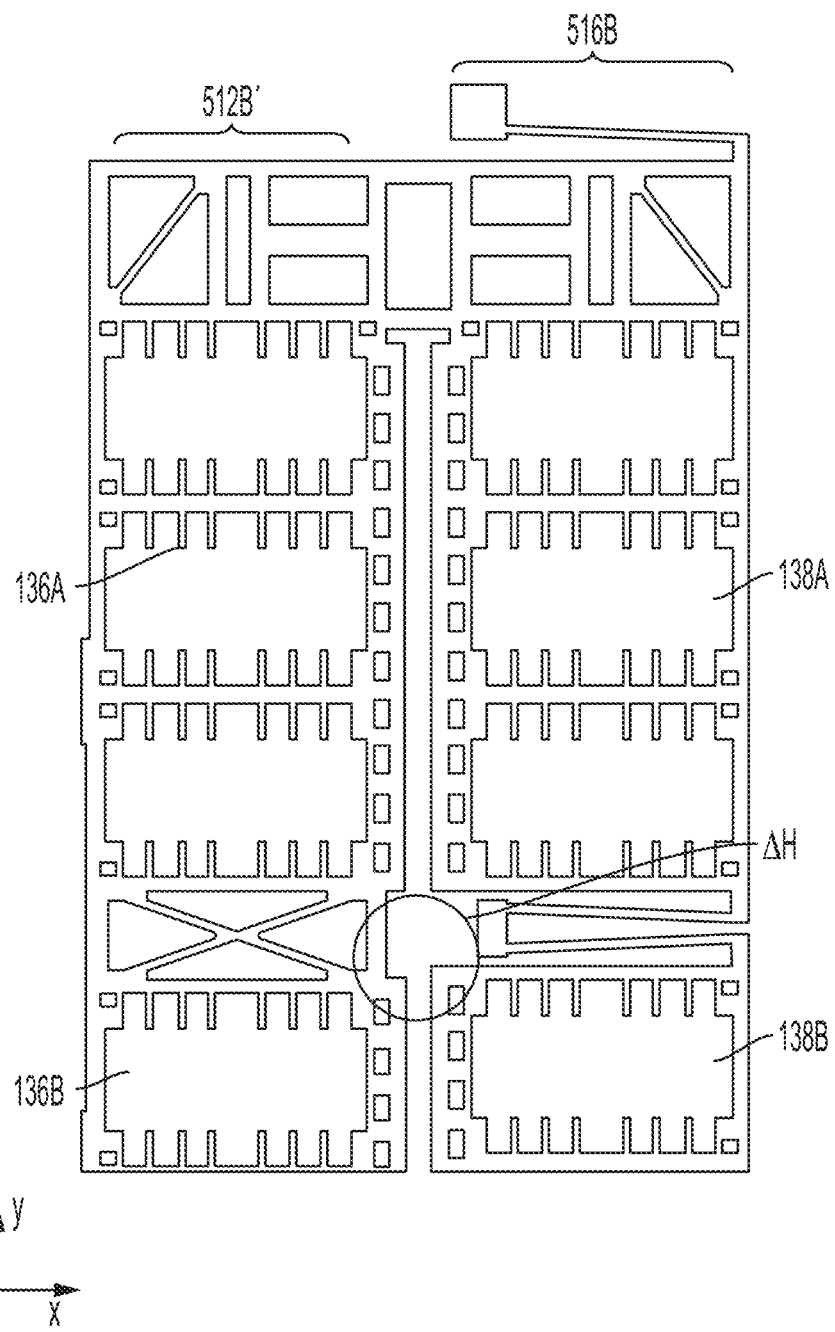
FIG. 9C illustrates aspects of the drive modules of FIG. 9B, according to some non-limiting embodiments.

As shown in FIG. 9B, and more particularly in FIG. 9C, unlike laterally adjacent drive modules of the roll and yaw columns, not all laterally adjacent drive modules of the MEMS device may move together in-phase. Instead, for adjacent yaw and pitch columns (illustrated herein as columns 502B and 502C) and/or adjacent roll and pitch columns, every other pair of laterally adjacent drive modules move together in-phase, while other pairs of laterally adjacent drive modules move out-of-phase with respect to each other. For example, laterally adjacent drive module pair 136A and 138A moves together in-phase while laterally adjacent drive module pair 136B and 138B moves out-of-phase with respect to each other. FIG. 9C illustrates laterally adjacent drive modules 136A and 138A which move in-phase being coupled together (e.g., rigidly) by one or more couplers 518 while laterally adjacent drive modules 136B and 138B which move out-of-phase (illustrated in part by the height difference ΔH between drive modules 136B and 138B) may be untethered. Thus, between the second column 502B configured to sense yaw rotation and the third column 502C configured to sense pitch rotation, coupling between laterally adjacent pairs of drive modules is staggered given that only every other pair of drive modules move in-phase.

The inventors have recognized that, due to the motion of respective pairs of laterally adjacent drive modules, it may be advantageous to configure the MEMS device having columns configured to sense roll and yaw rotation, respectively, (e.g., columns 502A and 502B) disposed adjacent to each other such that all of the laterally adjacent pairs of drive modules between the two columns move together in-phase. Doing so allows all of the laterally adjacent pairs of drive modules to be rigidly coupled together enabling stronger drive mode coupling.

Figure 10:
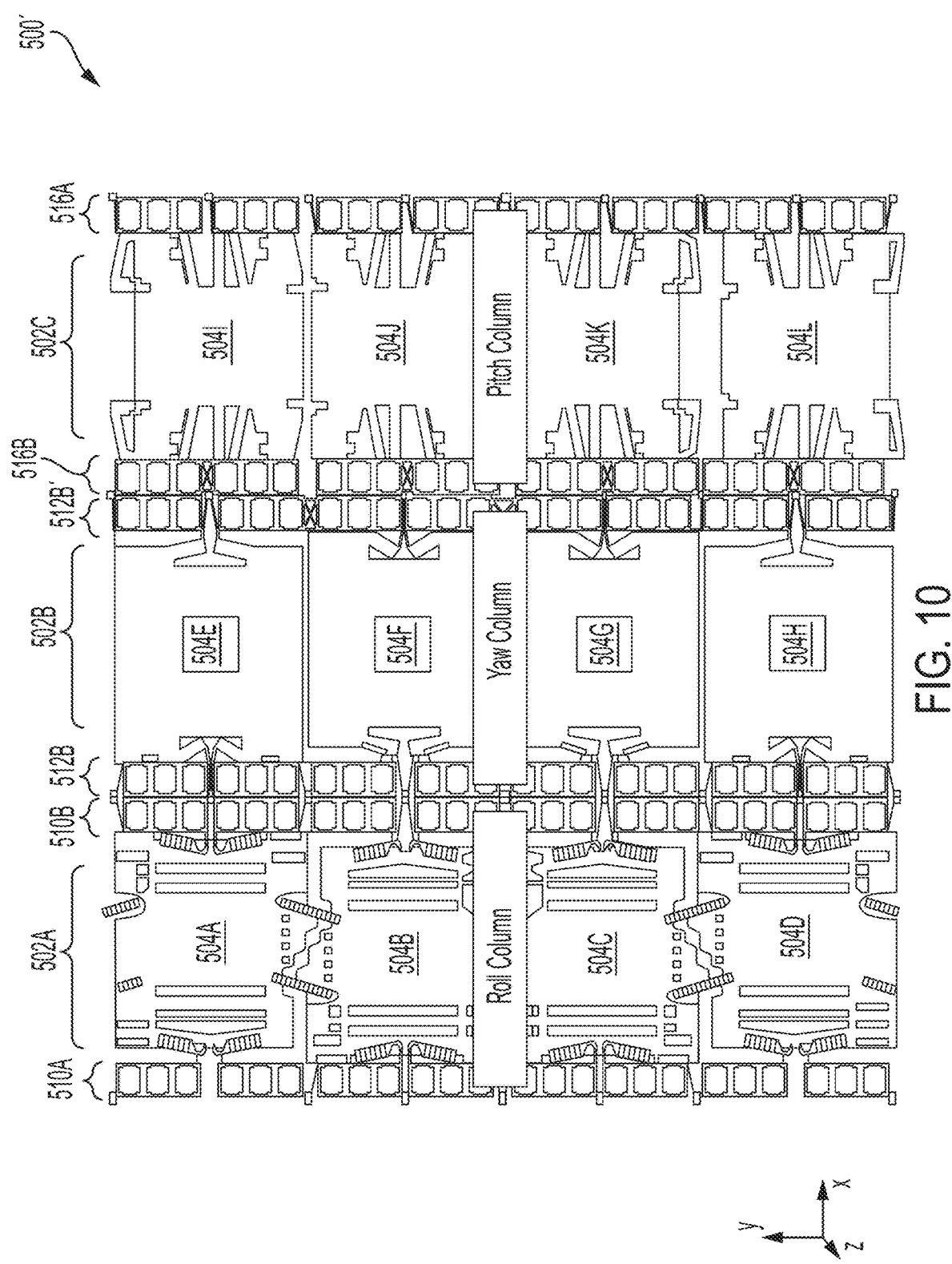
FIG. 10 is a top view illustrating schematically a non-limiting example of a three-axis gyroscope having multiple-mass columns for sensing rotation about a respective axis, with drive arrays of adjacent columns being coupled together, according to some embodiments of the technology described herein.

FIG. 10 is a top view illustrating schematically a non-limiting example of a three-axis gyroscope having multiple-mass columns for sensing rotation about a respective axis, with drive arrays of adjacent columns being coupled together, according to some embodiments of the technology described herein. FIG. 10 is a schematic illustration of the MEMS device 500' shown in FIG. 5C having three multiple-mass columns: a first column 502A configured to sense roll rotation, a second column 502B configured to sense yaw rotation, and a third column 502C configured to sense pitch rotation. Each of the multiple-mass columns comprise at least four proof masses (e.g., proof masses 504A-504D, 504E-504H, and 504I-504L) disposed in a common plane.

As described herein, each of the three columns 502A-502C of proof masses may have a pair of drive arrays disposed alongside the column and configured to displace the proof masses of the respective column to facilitate detection of angular rates. For example, first column 502A comprises proof masses 504A-504D, each proof mass of the first column being coupled to drive array 510A on a left side of the proof mass, and 510B on a right side of the proof mass. Second column 502B comprises proof masses 504E-504H, each proof mass of the second column being coupled to drive array 512B on a left side of the proof mass and drive array 512B' on a right side of the proof mass. Third column 502C comprises proof masses 504I-504L, each proof mass of the third column being coupled to drive array 516B on a left side of the proof mass and 516A on a right side of the proof mass. As described herein, each proof mass may be coupled to multiple drive modules (shown but not labeled) per drive array (e.g., at least two drive modules on each of a right and left side of the proof mass). Each of the proof masses 504A-504L of the MEMS device 500' may be driven by their respective drive arrays at substantially the same frequency and at substantially the same amplitude. For example, proof mass 504A may be configured to move 5 μm to the right while proof mass 504I is configured to move up 5 μm.

As described herein, laterally adjacent pairs of drive modules (for example, drive modules of drive arrays 510B and 512B, and drive modules of drive arrays 512B' and 516B) may be coupled together. In particular, laterally adjacent pairs of drive modules which move together in-phase may be rigidly coupled together whereas laterally adjacent pairs of drive modules which move out-of-phase relative to each other may be flexibly coupled together or may not be coupled together. For the MEMS device 500', each of the laterally adjacent pairs of drive modules of drive arrays 510B and 512B are rigidly coupled, whereas coupling between drive arrays 512B' and 516B is staggered (e.g., every other laterally adjacent drive module pair being coupled together). Configuring the MEMS device 500' with roll and yaw columns (e.g., columns 502A and 502B) adjacent to each other allows for rigid coupling of each laterally adjacent pair of drive modules of drive arrays 510B and 512B as each of the drive modules of drive arrays 510B and 512B in laterally adjacent pairs move together in-phase.

The MEMS device 500' may be configured according to the aspects of the technology described herein to facilitate linear and rotational balancing of the MEMS device 500'. In particular, the relative motion and the relative mass of the proof masses in each column may controlled to achieve such linear and rotational balancing.

MEMS gyroscopes of the types described herein may be deployed in various settings to detect angular rates, including sports, healthcare, military, and industrial applications, among others. A MEMS gyroscope may be mounted as a wearable sensor deployed in monitoring sports-related physical activity and performance, patient health, military personnel activity, or other applications of interest of a user. A MEMS gyroscope may be disposed in a smartphone, and may be configured to sense roll, pitch and/or yaw angular rates.

Figure 11:
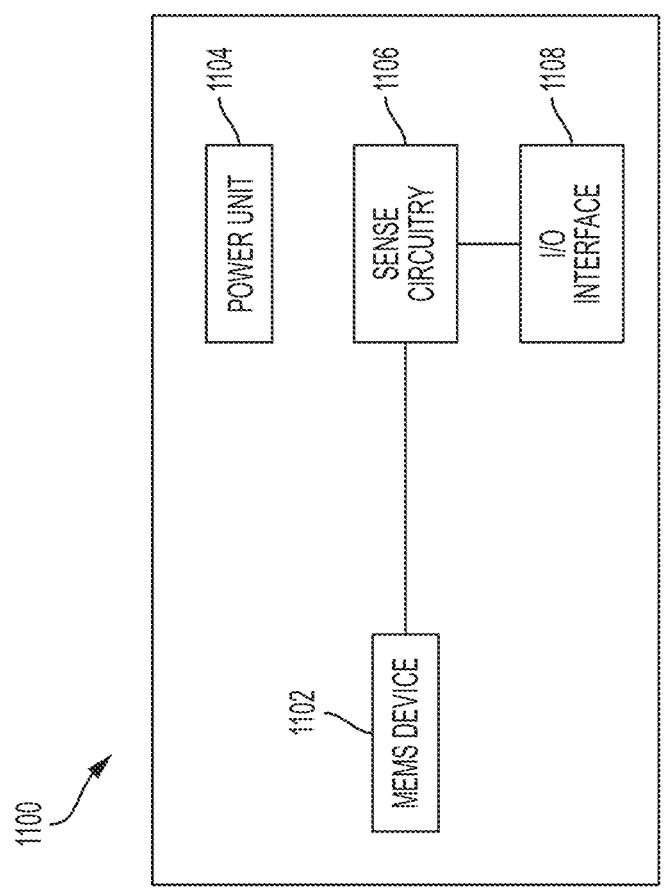
FIG. 11 is a block diagram illustrating an example system including a MEMS gyroscope, according to some non-limiting embodiments.

FIG. 11 is a block diagram illustrating a system 1100 comprising a MEMS device 1102, a power unit 1104, sense circuitry 1106 and input/output (I/O) interface 1108. MEMS device 1102 may comprise any one or a combination of the MEMS devices described herein. The MEMS device(s) may be configured to sense roll, pitch and/or yaw angular rates.

System 1100 may periodically transmit, via wired connections or wirelessly, data representing sensed angular rates to an external monitoring system, such as a computer, a smartphone, a tablet, a smartwatch, smartglasses, or any other suitable receiving device. I/O interface 1108 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 1108 may be configured to transmit and/or receive data using proprietary connectivity protocols. I/O interface 1108 may comprise one or more antennas, such as a microstrip antenna. In some embodiments, I/O interface 1108 may be connected to a cable, and may be configured to transmit and/or receive signals through the cable.

System 1100 may be powered using power unit 1104. Power unit 1104 may be configured to power some or all of sense circuitry 1106, I/O interface 1108, MEMS device 1102. In some embodiments, power unit 1104 may comprise one or more batteries. System 1100 may, in at least some embodiments, consume sufficiently little power to allow for its operation for extended periods based solely on battery power. The battery or batteries may be rechargeable in some embodiments. Power unit 1104 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 1104 may comprise circuitry to convert AC power to DC power. For example, power unit 1104 may receive AC power from a power source external to system 1100, such as via I/O interface 1108, and may provide DC power to some or all the components of system 1100. In such instances, power unit 1104 may comprise a rectifier, a voltage regulator, a DC-DC converter, or any other suitable apparatus for power conversion.

Power unit 1104 may comprise energy harvesting components and/or energy storage components, in some embodiments. Energy may be harvested from the surrounding environment and stored for powering the system 1100 when needed, which may include periodic, random, or continuous powering. The type of energy harvesting components implemented may be selected based on the anticipated environment of the system 1100, for example based on the expected magnitude and frequency of motion the system 1100 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

Figure 12:
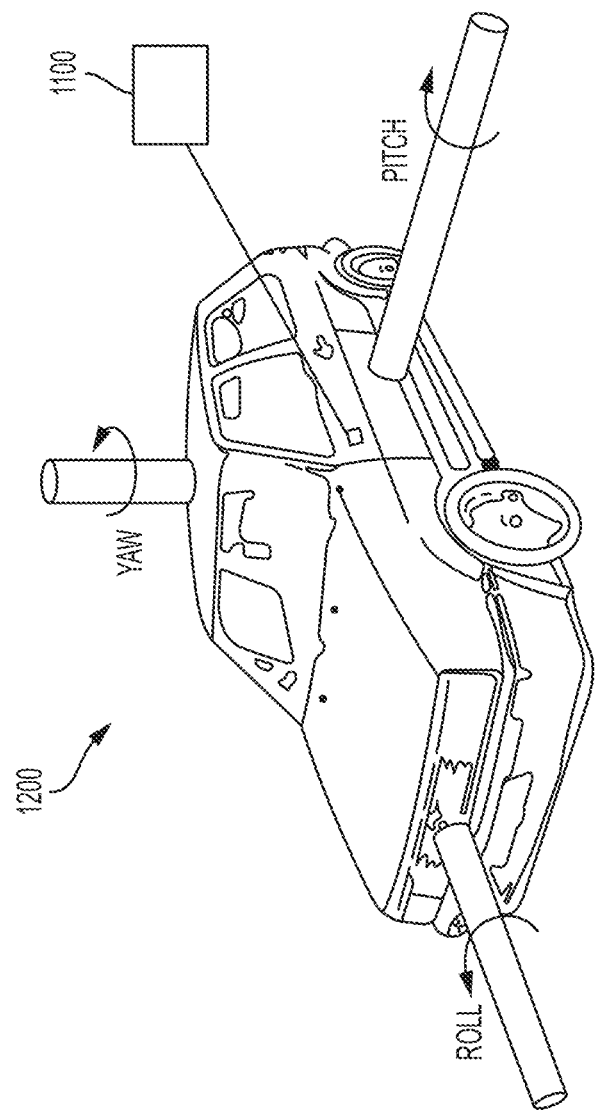
FIG. 12 is a perspective view illustrating an automobile including an example system having a MEMS gyroscope, according to some non-limiting embodiments.

As described above, MEMS devices of the types described herein may be deployed in various settings to detect angular rates. One such setting is in automobiles, or other vehicles, such as boats or aircrafts. FIG. 12 illustrates schematically an automobile 1200 comprising a system 1100, according to some non-limiting embodiments. System 1100 may be disposed in any suitable location of automobile 1200. In some embodiments, the system 1100 may comprise a package or housing attached to a suitable part of the automobile 1200, with the MEMS device inside. System 1100 may be configured to sense roll, pitch and/or yaw angular rates. System 1100 may be configured to provide, using I/O interface 1108, sensed angular rates to a computer system disposed in automobile 1200 and/or to a computer system disposed on a base station outside automobile 1200.

Another setting in which MEMS devices of the types described herein may be used is in sensor devices for sports applications, such as tennis, swimming, running, baseball, or hockey, among other possibilities. In some embodiments, a MEMS device of the types described herein may be a wearable fitness device. In other embodiments, the sensor may be part of a piece of sporting equipment, such as being part of a tennis racket, baseball bat, or hockey stick. Sense data from the sensor may be used to assess performance of the user.

Aspects of the technology described herein may provide one or more benefits, some of which have been previously described. Now described are some non-limiting examples of such benefits. It should be appreciated that not all aspects and embodiments necessarily provide all of the benefits described herein. Further, it should be appreciated that aspects of the technology described herein may provide additional benefits to those described herein.

Aspects of the technology described herein provide columnar multi-axis MEMS gyroscopes configured being linearly and rotationally balanced. Thus, the MEMS devices described herein may reject linear and angular acceleration not about a desired axis which may otherwise couple into the sense mode and cause sensing inaccuracies. In some embodiments, the MEMS gyroscopes may have at least two multiple-mass columns configured to sense rotation about a respective axis (e.g., roll, yaw, or pitch rotation). The MEMS devices described herein may further comprise one or more drive arrays disposed alongside respective columns of proof masses, and the drive arrays may comprise at least two drive modules per proof mass to facilitate stronger coupling between the components of the MEMS device as well as achieving net-zero momentum of the drive arrays.

The expressions "substantially in a direction" and "substantially parallel to a direction" should be interpreted herein as parallel to the direction or angled with respect to the direction by less than 20°, including any value within that range.

The terms "approximately" and "about" may be used to mean±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A gyroscope, comprising:
   a first plurality of proof masses arranged linearly in a first plane and configured for detection of motion about a first axis of rotation, the first plurality of proof masses comprising at least three proof masses configured to translate along a first axis of the first plane;
   a second plurality of proof masses arranged linearly in the first plane and configured for detection of motion about a second axis of rotation, the second plurality of proof masses comprising at least three proof masses configured to translate along a second axis perpendicular to the first axis;
   a first drive array coupled to the first plurality of proof masses and configured to cause translation of the first plurality of proof masses along the first axis of the first plane by displacement of the first drive array along the second axis perpendicular to the first axis; and
   a second drive array coupled to the second plurality of proof masses, the second drive array configured to cause translation of the second plurality of proof masses along the second axis by displacement of the second drive array along the second axis.

2. The gyroscope of claim 1, wherein each of the first and second drive arrays comprise a plurality of drive modules, each of the plurality of drive modules comprising at least one electrode.

3. The gyroscope of claim 2, wherein each proof mass of the first plurality of proof masses is coupled to at least two drive modules of the plurality of drive modules of the first drive array.

4. The gyroscope of claim 2, wherein a first group of drive modules of the plurality of drive modules of the first drive array is configured to move in a first direction along the second axis when a second group of drive modules of the plurality of drive modules of the first drive array moves in a second direction along the second axis opposite to the first direction.

5. The gyroscope of claim 2, wherein adjacent drive modules of the plurality of drive modules of the first and second drive arrays are coupled together.

6. The gyroscope of claim 1, further comprising:
   a third plurality of proof masses arranged linearly in the first plane and configured for detection of motion about a third axis of rotation, the third plurality of proof masses comprising at least three proof masses; and
   a third drive array coupled to the third plurality of proof masses, the third drive array configured to cause translation of the third plurality of proof masses by displacement of the third drive array along the second axis.

7. The gyroscope of claim 6, wherein displacement of the third drive array along the second axis causes translation of the third plurality of proof masses along the first axis.

8. The gyroscope of claim 6, further comprising a fourth drive array coupled to third drive array and the second plurality of proof masses.

9. The gyroscope of claim 6, wherein the first, second, and third pluralities of proof masses each comprise four proof masses.

10. The gyroscope of claim 1, wherein the gyroscope is configured to detect the motion about the first axis of rotation based on detection of motion of the first plurality of proof masses perpendicular to the first plane.

11. The gyroscope of claim 10, wherein the gyroscope is further configured to detect the motion about the second axis of rotation based on detection of motion of the second plurality of proof masses perpendicular to the first plane.

12. A gyroscope, comprising:
    first, second, and third pluralities of proof masses arranged linearly in a first plane, each of the first, second, and third pluralities of proof masses comprising at least three proof masses for detection of rotation about a respective axis; and
    first, second, and third drive arrays coupled to respective ones of the first, second, and third pluralities of proof masses, the first, second, and third drive arrays configured to cause translation of the respective ones of the first, second, and third pluralities of proof masses.

13. The gyroscope of claim 12, wherein the first, second and third drive arrays cause the translation of the respective ones of the first, second, and third pluralities of proof masses when the first, second, and third drive arrays are displaced along a first axis of the first plane.

14. The gyroscope of claim 13, wherein the first plurality of proof masses translate along a second axis perpendicular to the first axis when the first drive array moves along the first axis.

15. The gyroscope of claim 12, wherein the first, second, and third drive arrays are arranged alongside the respective ones of the first, second, and third pluralities of proof masses.

16. The gyroscope of claim 12, wherein each of the first, second, and third drive arrays comprise a plurality of drive modules having at least one electrode.

17. The gyroscope of claim 16, wherein each of the first, second, and third drive arrays comprise a first plurality of drive modules arranged along a first side of a respective plurality of proof masses and a second plurality of drive modules arranged along a second side of the respective plurality of proof masses opposite the first side.

18. The gyroscope of claim 16, wherein at least some of the plurality of drive modules of the first drive array are coupled to at least some of the plurality of drive modules of the second drive array.

19. The gyroscope of claim 12, wherein each of the first, second, and third pluralities of proof masses comprise four proof masses.

20. The gyroscope of claim 19, wherein:
    outer proof masses of the first plurality of proof masses translate in a direction opposite a direction of translation of inner proof masses of the first plurality of proof masses.

* * * * *